(12) United States Patent
Chen et al.

(10) Patent No.: US 11,777,143 B2
(45) Date of Patent: Oct. 3, 2023

(54) SOLID ELECTROLYTE, ELECTRODE, POWER STORAGE DEVICE, AND METHOD FOR PRODUCING SOLID ELECTROLYTES

(71) Applicants: IMEC VZW, Leuven (BE); PANASONIC CORPORATION, Osaka (JP)

(72) Inventors: Xubin Chen, Leuven (BE); Knut Bjarne Gandrud, Leuven (BE); Maarten Mees, Kessel-Lo (BE); Philippe M. Vereecken, Liège (BE); Akihiko Sagara, Nara (JP); Hiroki Yabe, Osaka (JP); Hidekazu Arase, Hyogo (JP)

(73) Assignees: IMEC VZW, Leuven (BE); PANASONIC HOLDINGS CORPORATION, Osaka (JP)

( * ) Notice: Subject to any disclaimer, the term of this patent is extended or adjusted under 35 U.S.C. 154(b) by 389 days.

(21) Appl. No.: 17/060,821

(22) Filed: Oct. 1, 2020

(65) Prior Publication Data
US 2021/0020988 A1 Jan. 21, 2021

Related U.S. Application Data

(63) Continuation of application No. PCT/JP2020/002180, filed on Jan. 22, 2020.

(30) Foreign Application Priority Data

Jun. 21, 2019 (JP) ................................ 2019-115275

(51) Int. Cl.
*H01M 10/0565* (2010.01)

(52) U.S. Cl.
CPC ................. *H01M 10/0565* (2013.01); *H01M 2300/0082* (2013.01)

(58) Field of Classification Search
None
See application file for complete search history.

(56) References Cited

U.S. PATENT DOCUMENTS

| 2003/0129495 A1* | 7/2003 | Yamato ................. H01M 4/525 |
| | | 429/223 |
| 2009/0004550 A1* | 1/2009 | McFarland ......... H01M 8/1004 |
| | | 427/457 |
| 2012/0021279 A1 | 1/2012 | Le Bideau et al. |
| 2019/0020069 A1 | 1/2019 | Moganty et al. |

FOREIGN PATENT DOCUMENTS

| JP | 2012-518248 A | 8/2012 |
| WO | 2018/029580 A1 | 2/2018 |
| WO | 2018/197073 A1 | 11/2018 |

OTHER PUBLICATIONS

European Search Report issued in European Patent Application No. 20796681.3, dated May 17, 2021.
International Search Report and Written Opinion issued in International Patent Application No. PCT/JP2020/002180, dated Mar. 24, 2020; with partial English translation.

* cited by examiner

*Primary Examiner* — Anca Eoff
(74) *Attorney, Agent, or Firm* — McDermott Will & Emery LLP

(57) ABSTRACT

A solid electrolyte of the present disclosure includes: a porous dielectric having a plurality of pores interconnected mutually; and an electrolyte including a metal salt and at least one selected from the group consisting of an ionic compound and a bipolar compound and at least partially filling an interior of the plurality of pores. Inner surfaces of the plurality of pores of the porous dielectric are at least partially modified by a functional group containing a halogen atom.

19 Claims, 11 Drawing Sheets

SOLID ELECTROLYTE, ELECTRODE, POWER STORAGE DEVICE, AND METHOD FOR PRODUCING SOLID ELECTROLYTES

This application is a continuation of PCT/JP2020/002180 filed on Jan. 22, 2020, which claims foreign priority of Japanese Patent Application No. 2019-115275 filed on Jun. 21, 2019, the entire contents of both of which are incorporated herein by reference.

BACKGROUND OF THE INVENTION

1. Field of the Invention

The present invention relates to a solid electrolyte, electrode, power storage device, and method for producing solid electrolytes.

2. Description of Related Art

All-solid-state lithium secondary batteries have recently been under development as next-generation batteries. It has been desired to improve the ionic conductivity of solid electrolytes used in power storage devices such as all-solid-state lithium secondary batteries.

JP 2012-518248 A discloses a method for producing solid electrolytes by a sol-gel process using a liquid mixture containing an ionic liquid, lithium salt, and silica precursor.

SUMMARY OF THE INVENTION

The present disclosure provides a new solid electrolyte with high ionic conductivity.

The present disclosure provides a solid electrolyte including:
 a porous dielectric having a plurality of pores interconnected mutually; and
 an electrolyte including a metal salt and at least one selected from the group consisting of an ionic compound and a bipolar compound and at least partially filling an interior of the plurality of pores, wherein
 inner surfaces of the plurality of pores of the porous dielectric are at least partially modified by a functional group containing a halogen atom.

The present disclosure can provide a new solid electrolyte with high ionic conductivity.

Figure 1A:
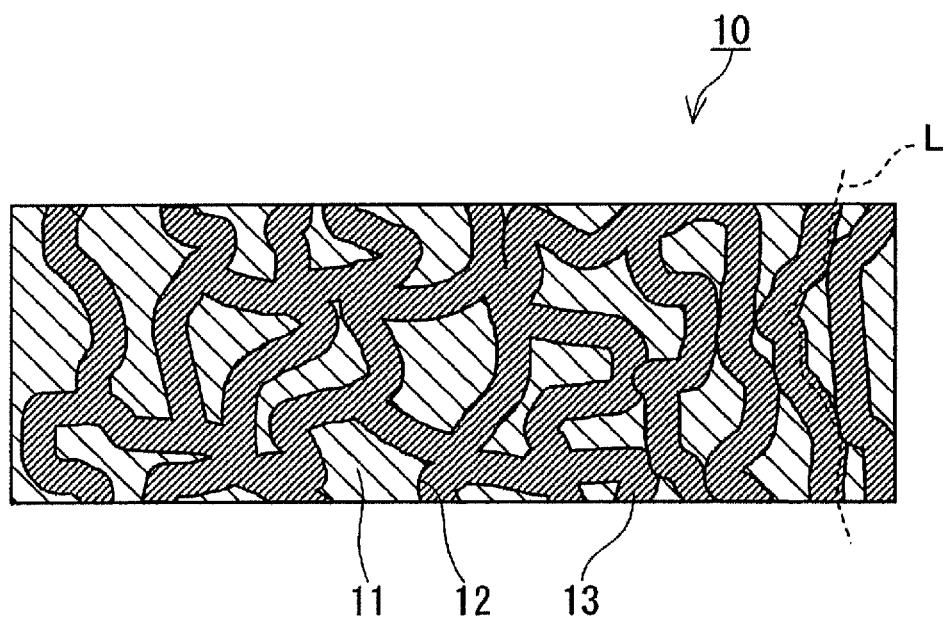
FIG. 1A schematically shows an example of a cross-sectional structure of a solid electrolyte according to a first embodiment.

DETAILED DESCRIPTION (Findings on which the Present Disclosure is Based)

The solid electrolyte described in JP 2012-518248 A has a supporting skeleton formed of $SiO_2$ having a mesoporous structure. Orientation of molecules in an ionic liquid to the inner surface of a pore improves the lithium ion conductivity.

In the above configuration, because of the presence of an OH group at the surface of $SiO_2$, the molecules in the ionic liquid are adsorbed and oriented to the surface of $SiO_2$ and ionic polarization is induced. This promotes $Li^+$ conduction. However, because the OH group density is low, the adsorption and orientation of the molecules in the ionic liquid to the surface of $SiO_2$ are weak. Therefore, the ionic conduction promoting effect is low.

The present inventors have conceived the solid electrolyte of the present disclosure based on the above finding.

(Summary of One Aspect According to the Present Disclosure)

A solid electrolyte according to a first aspect of the present disclosure includes:

a porous dielectric having a plurality of pores interconnected mutually; and an electrolyte including a metal salt and at least one selected from the group consisting of an ionic compound and a bipolar compound and at least partially filling an interior of the plurality of pores, wherein inner surfaces of the plurality of pores of the porous dielectric are at least partially modified by a functional group containing a halogen atom.

According to the first aspect, adsorption and orientation of ions contained in the electrolyte to the porous dielectric are enhanced because of a high electronegativity of the halogen atom. As a result, the solid electrolyte exhibits high ionic conductivity.

According to a second aspect of the present disclosure, for example, in the solid electrolyte according to the first aspect, the halogen atom may be present at the end of the functional group. When the halogen atom is present at the end of the functional group, the halogen atom tends to be exposed at the inner surfaces of the plurality of pores of the porous dielectric and thus the above effect is easily obtainable.

According to a third aspect of the present disclosure, for example, in the solid electrolyte according to the first or second aspect, the halogen atom may be a chlorine atom. According to the third aspect, the solid electrolyte exhibits a higher ionic conductivity.

According to a fourth aspect of the present disclosure, for example, the solid electrolyte according to any one of the first to third aspects may further include a surface adsorption layer adsorbed to the inner surfaces of the plurality of pores to induce polarization. The surface adsorption layer improves the ionic conductance.

According to a fifth aspect of the present disclosure, for example, in the solid electrolyte according to any one of the first to fourth aspects, the electrolyte may include a polarization layer adsorbed to the inner surface of the pore of the porous dielectric or an inner surface of the surface adsorption layer, the polarization layer may include a first ion layer, a second ion layer, and a third ion layer, the first ion layer may be a layer including a plurality of first ions bonded to the porous dielectric or the surface adsorption layer, the plurality of first ions each may have a first polarity, the second ion layer may be a layer including a plurality of second ions bonded to the plurality of first ions, the plurality of second ions each may have a second polarity being a polarity opposite to the first polarity, the third ion layer may be a layer including a plurality of third ions bonded to the plurality of second ions, and the plurality of third ions each may have the first polarity. The polarization layer improves the ionic conductance.

According to a sixth aspect of the present disclosure, for example, in the solid electrolyte according to the fifth aspect, the plurality of first ions each may be an anion derived from the ionic compound or the metal salt, the plurality of second ions each may be a cation derived from the ionic compound, and the plurality of third ions each may be an anion derived from the ionic compound or the metal salt. The polarization layer can be composed of the cation and anion derived from the ionic compound or metal salt According to a seventh aspect of the present disclosure, for example, in the solid electrolyte according to the fifth or sixth aspect, the electrolyte may further include a bulk layer located farther from the inner surfaces of the plurality of pores than the polarization layer. The bulk layer also contributes to ion conduction.

According to an eighth aspect of the present disclosure, for example, in the solid electrolyte according to the fourth aspect, the surface adsorption layer may include water adsorbed to the inner surfaces of the plurality of pores. Water can effectively impart the ability to induce polarization of the polarization layer to the surface adsorption layer.

According to a ninth aspect of the present disclosure, for example, in the solid electrolyte according to the eighth aspect, the water may form 1 or more and 4 or less monomolecular layers. This allows water to stably exist at the inner surface of the pore of the porous dielectric.

According to a tenth aspect of the present disclosure, for example, in the solid electrolyte according to the fourth aspect, the surface adsorption layer may include a polyether adsorbed to the inner surfaces of the plurality of pores. The polyether can effectively impart the ability to induce polarization of the polarization layer to the surface adsorption layer.

According to an eleventh aspect of the present disclosure, for example, in the solid electrolyte according to the tenth aspect, the polyether may include polyethylene glycol. Polyethylene glycol can effectively form the surface adsorption layer.

According to a twelfth aspect of the present disclosure, for example, in the solid electrolyte according to any one of the first to eleventh aspects, the metal salt may be a lithium salt. In the case where the electrolyte includes a lithium salt, the solid electrolyte of the present disclosure is applicable to lithium-ion secondary batteries.

According to a thirteenth aspect of the present disclosure, for example, in the solid electrolyte according to the twelfth aspect, the lithium salt may include lithium bis(trifluoromethanesulfonyl)imide. With the use of Li-TFSI, the solid electrolyte having high ionic conductivity can be obtained.

According to a fourteenth aspect of the present disclosure, for example, in the solid electrolyte according to any one of the first to thirteenth aspects, the ionic compound may be an ionic liquid. Having properties such as flame retardancy, poor volatility, and high ionic conductance, the ionic liquid is suitable as the material of the solid electrolyte.

According to a fifteenth aspect of the present disclosure, for example, in the solid electrolyte according to the fourteenth aspect, the ionic liquid may include a bis(trifluoromethanesulfonyl)imide anion. Among anions to be contained in the ionic liquid, the bis(trifluoromethanesulfonyl) imide anion is suitable for the solid electrolyte of the present disclosure.

According to a sixteenth aspect of the present disclosure, for example, in the solid electrolyte according to the fifteenth aspect, the ionic liquid may include 1-butyl-1-methylpyrrolidinium bis(trifluoromethanesulfonyl)imide. This ionic liquid is suitable for the solid electrolyte of the present disclosure.

According to a seventeenth aspect of the present disclosure, for example, in the solid electrolyte according to any one of the first to sixteenth aspects, the porous dielectric may be porous silica. Porous silica is chemically stable and thus suitable as a matrix material of the solid electrolyte.

According to an eighteenth aspect of the present disclosure, for example, in the solid electrolyte according to any one of the first to seventeenth aspects, the porous dielectric may form a single layer, and an outer boundary of the solid electrolyte may be defined by the porous dielectric. Such a configuration allows easy handling of the solid electrolyte and easy application of the solid electrolyte to, for example, power storage devices.

An electrode according to a nineteenth aspect of the present disclosure includes:
   the solid electrolyte according to any one of the first to eighteenth aspects; and
   an electrode active material.

According to the nineteenth aspect, an electrode having excellent electrical characteristics can be obtained.

In a twentieth aspect of the present disclosure, for example, the electrode according to the nineteenth aspect may further include at least one selected from a conductive auxiliary agent and a binder. The conductive auxiliary agent contributes to a sufficient reduction in the internal resistance of the electrode. The binder serves to fix particles of the electrode active material to each other. When the particles of the electrode active material are fixed to each other, occurrence of a gap due to expansion and shrinkage of the particles of the electrode active material is reduced. This reduces a decrease in the discharged capacity of a battery including the electrode.

A power storage device according to a twenty-first aspect of the present disclosure includes:
   a positive electrode;
   a negative electrode; and
   the solid electrolyte according to any one of the first to eighteenth aspects.

According to the twenty-first aspect, a power storage device having excellent electrical characteristics can be obtained.

A power storage device according to a twenty-second aspect of the present disclosure includes:
   a positive electrode; and
   a negative electrode, wherein
   at least one selected from the positive electrode and the negative electrode is the electrode according to the nineteenth or twentieth aspect.

According to the twenty-second aspect, a power storage device having excellent electrical characteristics can be obtained.

A method for producing solid electrolytes according to a twenty-third aspect of the present disclosure includes:
   mixing a precursor of a porous dielectric, at least one selected from the group consisting of an ionic compound and a bipolar compound, a metal salt, water, and an organic solvent to prepare a liquid mixture;
   causing gelation of the liquid mixture to form a gel mixture; and
   drying the gel mixture to form a solid electrolyte, wherein the precursor includes a functional group containing a halogen atom.

According to the twenty-third aspect, the solid electrolyte of the present disclosure can be efficiently produced.

According to a twenty-fourth aspect, for example, in the method for producing solid electrolytes according to the twenty-third aspect, the precursor may include a metal alkoxide having the functional group containing a halogen atom. According to the twenty-fourth aspect, the solid electrolyte of the present disclosure can be efficiently produced.

According to a twenty-fifth aspect, for example, in the method for producing solid electrolytes according to the twenty-fourth aspect, the metal alkoxide may be a silicon alkoxide. With the use of a silicon alkoxide, a porous dielectric can be efficiently formed.

Hereinafter, embodiments of the present invention will be described with reference to the drawings. The present invention is not limited to the following embodiments.

First Embodiment

FIG. 1A schematically shows an example of a cross-sectional structure of a solid electrolyte 10 according to a first embodiment. The solid electrolyte 10 includes a porous dielectric 11 and an electrolyte 13. The porous dielectric 11 has a plurality of pores 12 interconnected mutually. The plurality of pores 12 are what are called continuous pores. Incidentally, the plurality of pores 12 may include an isolated pore. The electrolyte 13 covers the inner surfaces of these pores 12. The electrolyte 13 may at least partially fill the interior of the plurality of pores 12, or may completely fill the interior of the plurality of pores 12.

Figure 1B:
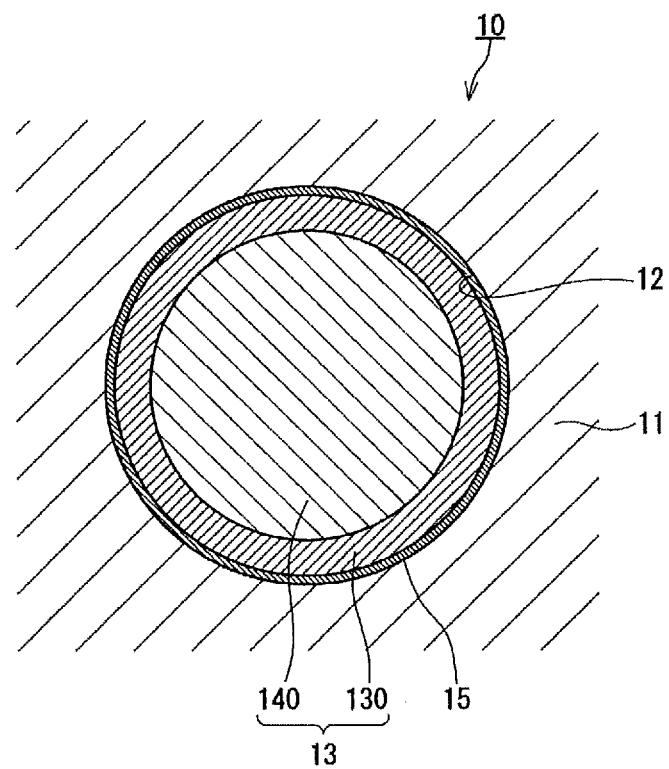
FIG. 1B schematically shows a cross-section of a pore of a porous dielectric.

FIG. 1B schematically shows an example of a cross-section of the pore 12 of the porous dielectric 11. The electrolyte 13 includes a polarization layer 130. The polarization layer 130 is a layer adsorbed to the inner surface of a surface adsorption layer 15. The polarization layer 130 may be a continuous film continuously formed along a direction in which the pore 12 extends. In the polarization layer 130, the ions contained in the electrolyte 13 are oriented regularly. The polarization layers 130 provided on the inner surfaces of the plurality of pores 12 may be mutually interconnected to form a three-dimensional network. As indicated by a dotted line L in FIG. 1A, a conduction path through which a metal ion moves is formed near the inner surface of the porous dielectric 11. Specifically, a conduction path through which a metal ion moves is formed on the inner surface of the polarization layer 130.

As shown in FIG. 1B, the electrolyte 13 may include a bulk layer 140. The bulk layer 140 has contact with the inner surface of the polarization layer 130. The bulk layer 140 is located farther from the inner surface of the pore 12 than the polarization layer 130. In other words, the bulk layer 140 is located in the central portion of the pore 12. The bulk layer 140 is surrounded by the polarization layer 130. The bulk layer 140 is a layer in which the ions derived from the ionic compound and metal salt are oriented irregularly. In the bulk layer 140, the ions may have flowability. The bulk layer 140 also contributes to metal ion conduction.

As shown in FIG. 1B, the solid electrolyte 10 may further include the surface adsorption layer 15. The surface adsorption layer 15 is located between the inner surface of the pore 12 and electrolyte 13. The surface adsorption layer 15 is a layer adsorbed to the inner surfaces of the plurality of pores 12 to induce polarization. Because of the presence of the surface adsorption layer 15, the ionic conductance in the electrolyte 13 is improved and the ionic conductivity of the solid electrolyte 10 is increased. The surface adsorption layer 15 is, however, not necessarily required.

Figure 1C:
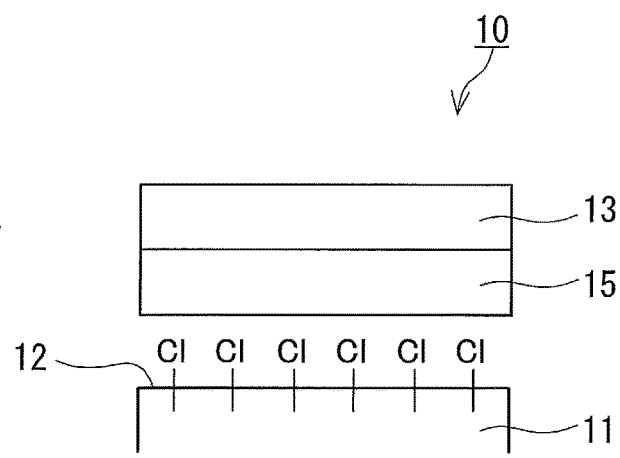
FIG. 1C schematically shows a condition of the inner surfaces of a plurality of pores of a porous dielectric.

FIG. 1C schematically shows a condition of the inner surfaces of the plurality of pores 12 of the porous dielectric 11. In the present embodiment, the inner surfaces of the plurality of pores 12 of the porous dielectric 11 are at least partially modified by a functional group containing a halogen atom. In other words, a functional group containing a halogen atom is present at the inner surfaces of the plurality of pores 12. The skeleton of the porous dielectric 11 is at least partially terminated by the halogen atom. Adsorption and orientation of the ions contained in the electrolyte 13 to the porous dielectric 11 are enhanced because of a high electronegativity of the halogen atom. Consequently, the solid electrolyte 10 exhibits high ionic conductivity.

In the present embodiment, the surface adsorption layer 15 is adsorbed to a group of the functional groups containing the halogen atom.

Figure 1D:
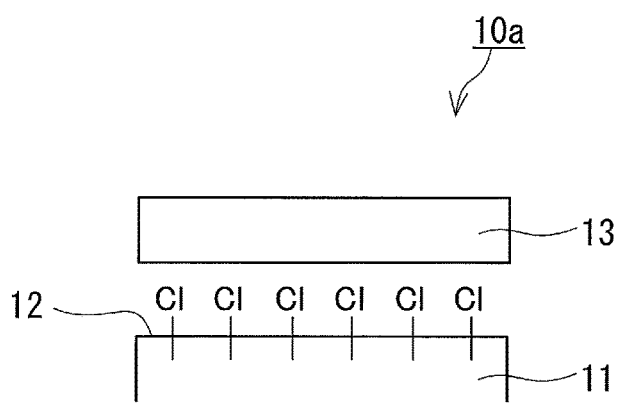
FIG. 1D schematically shows another condition of the inner surfaces of a plurality of pores of a porous dielectric.

FIG. 1D schematically shows another condition of the inner surfaces of the plurality of pores 12 of the porous dielectric 11. Without the surface adsorption layer 15, the electrolyte 13 is adsorbed to a group of the functional groups containing the halogen atom.

When the halogen atom is present at the end of the functional group, the halogen atom tends to be exposed at the inner surfaces of the plurality of pores 12 of the porous dielectric 11 and thus the above effect is easily obtainable. The functional group containing the halogen atom may be a halogen atom itself, or may be an alkyl group in which at least one hydrogen atom is substituted by a halogen atom.

The halogen atom is, for example, a chlorine atom. Adsorption and orientation of the ions contained in the electrolyte 13 to the porous dielectric 11 are further enhanced because of the presence of the chloride atom having a high electronegativity. As a result, the solid electrolyte 10 exhibits a higher ionic conductivity. The halogen atom may be a fluorine atom, bromine atom, or iodine atom.

The functional group containing the halogen atom is not necessarily present all over the inner surfaces of the plurality of pores 12. The inner surfaces of the plurality of pores 12 may include a portion without the functional group containing the halogen atom.

The term "solid" as used herein refers to being in solid state as a whole system at room temperature. Partial inclusion of a liquid is not excluded. Gels, for example, are "solid".

The porous dielectric 11 is, for example, porous silica. The porous silica is, for example, mesoporous silica. The porous silica is chemically stable and thus suitable as a matrix material of the solid electrolyte 10. The surface of the porous silica is hydrophilic. Thus, for example, when the surface adsorption layer 15 includes water, a water molecule can be stably adsorbed onto the porous silica. Other examples of the porous dielectric 11 include porous alumina ($Al_2O_3$), porous titania ($TiO_2$), porous zirconia ($ZrO_2$), and their mixtures.

The porous dielectric 11 may have a porosity in the range of 25% or more and 95% or less. The diameter of each pore 12 of the porous dielectric 11 is, for example, in the range of 2 nm or more and 300 nm or less. The diameters of the pores 12 may be measured, for example, by the following method. The solid electrolyte 10 is immersed in an organic solvent to dissolve the electrolyte 13 in the organic solvent. The electrolyte 13 is then removed by supercritical drying, followed by measurement of the specific surface area of the porous dielectric 11 by the BET method. From the result of the measurement, the porosity and the diameters of the pores 12 (micropore distribution) can be calculated. Alternatively, the porosity and the diameters of the pores 12 can be determined by preparing a thin piece of the solid electrolyte 10 by the focused ion beam (FIB) technique and observing the thin piece of the solid electrolyte 10 with a transmission electron microscope (TEM).

In the present embodiment, the porous dielectric 11 forms a single layer. The layer of the porous dielectric 11 may be self-supporting. The outer boundary of the solid electrolyte 10 is defined by the porous dielectric 11. Such a configuration allows easy handling of the solid electrolyte 10 and easy application of the solid electrolyte 10 to, for example, power storage devices.

The electrolyte 13 includes, for example, an ionic compound. The ionic compound can be an ionic liquid. Having properties such as flame retardancy, poor volatility, and high ionic conductance, the ionic liquid is suitable as the material of the solid electrolyte 10. Ions in the ionic liquid can move relatively freely. Therefore, for example, when the electrolyte 13 includes the polarization layer 130, the ions in the polarization layer 130 can be oriented efficiently.

Examples of a cation to be contained in the ionic liquid include a 1-butyl-1-methylpyrrolidinium cation ($BMP^+$), 1-butyl-3-methylimidazolium cation ($BMI^+$), 1-ethyl-3-methylimidazolium cation ($EMI^+$), 1,2-dimethyl-3-propylimidazolium cation ($DMPI^+$), 1,2-diethyl-3,5-dimethylimidazolium cation ($DEDMI^+$), trimethyl-n-hexylammonium cation ($TMHA^+$), n-butyl-n-methylpyrrolidinium cation ($PYR14^+$), n-methyl-n-pentylpyrrolidinium cation ($PYR15^+$), n-methyl-n-propylpiperidinium cation ($PIP^+$), and triethylsulfonium cation ($TES^+$).

Among the cations to be contained in the ionic liquid, the 1-butyl-1-methylpyrrolidinium cation ($BMP^+$) and triethylsulfonium cation ($TES^+$) are suitable for the solid electrolyte 10 of the present disclosure. In the case where, for example, the $BMP^+$ forms a cation layer described later, the $BMP^+$ can be oriented so that the longitudinal direction of the $BMP^+$ (i.e., a direction in which a n-butyl group of the $BMP^+$ extends) will be along the inner surface of the pore 12. Therefore, the thickness of the polarization layer 130 with respect to the number of ion layers forming the polarization layer 130 can be reduced, and polarization of the polarization layer 130 can be efficiently induced.

Examples of an anion to be contained in the ionic liquid include a bis(trifluoromethanesulfonyl)imide anion ($TFSI^-$), bis(fluorosulfonyl)imide anion ($FSI^-$), bis(pentafluoroethanesulfonyl)imide anion ($BETI^-$), triflate anion ($OTf^-$), dicyanamide anion ($DCA^-$), dimethyl phosphate anion ($DMP^-$), diethyl phosphate anion ($DEP^-$), dibutyl phosphate anion ($DBP^-$), 2,2,2-trifluoro-n-(trifluoromethanesulfonyOacetimide anion ($TSAC^-$), perchlorate anion ($ClO_4^-$), perfluoroalkyl fluorophosphate anion ($FAP^-$), tetrafluoroborate anion ($BF_4^-$), and hexafluorophosphate anion ($PF_6^-$).

Among the anions to be contained in the ionic liquid, the bis(trifluoromethanesulfonyl)imide anion ($TFSI^-$) is suitable for the solid electrolyte 10 of the present disclosure. In the case where, for example, the $TFSI^-$ forms an anion layer described later, the $TFSI^-$ is likely to be oriented regularly because the $TFSI^-$ is rotationally symmetric.

The ionic liquid can be composed of a combination of any of the above cations and any of the above anions. At least one selected from the group consisting of 1-butyl-1-methylpyrrolidinium bis(trifluoromethanesulfonyl)imide and triethylsulfonium bis(trifluoromethanesulfonyl)imide can be used as the ionic liquid. These ionic liquids are suitable for the solid electrolyte 10 of the present disclosure.

The electrolyte 13 further includes a metal salt. The metal salt dissolves in the ionic compound and forms the electrolyte 13 along with the ionic compound. For example, an ion of the metal salt can function as a carrier. Examples of a cation of the metal salt include $Li^+$, $Na^+$, $K^+$, $Ca^{2+}$, $Mg^{2+}$, $Cu^{2+}$, $Al^{3+}$, $Co^{2+}$, and $Ni^{2+}$.

The metal salt may be a lithium salt. In the case where the electrolyte 13 includes a lithium salt, a lithium ion can function as a carrier, and thus the solid electrolyte 10 of the present disclosure is applicable to lithium-ion secondary batteries.

Examples of the lithium salt include lithium perchlorate ($LiClO_4$), lithium borofluoride ($LiBF_4$), lithium hexafluorophosphate ($LiPF_6$), lithium bis(fluorosulfonyl)imide (Li—FSI), lithium bis(trifluoromethanesulfonyl)imide (Li-TFSI), lithium bis(pentafluoroethanesulfonyl)imide (Li-BETI), and trifluoromethanesulfonate (Li-OTf). One lithium salt or two or more lithium salts selected from these lithium salts can be used. With the use of Li-TFSI as the lithium salt, the solid electrolyte 10 having high ionic conductivity can be obtained. In the case where, for example, the TFSI$^-$ forms the anion layer described later, the TFSI$^-$ is likely to be oriented regularly because the TFSI$^-$ is rotationally symmetric.

The molar ratio of the ionic compound to the porous dielectric 11 is, for example, more than 0.25 and less than 3.5. This makes it possible to maintain the solid electrolyte 10 in solid state and improve the ionic conductivity. The molar ratio at which the maximum ionic conductivity is reached depends on the compositions of the porous dielectric 11 and ionic compound. An optimal molar ratio varies depending on the compositions of the porous dielectric 11 and ionic compound. The optimal molar ratio can be confirmed by producing a plurality of solid electrolytes having different molar ratios and evaluating the ionic conductivity thereof.

The solid electrolyte 10 exhibits high ionic conductivity even in a low-humidity environment. After stored, for example, in an environment at room temperature and at a low humidity of 0.0005% RH for a sufficient period of time, the solid electrolyte 10 exhibits an ionic conductivity of 1.0 mS/cm or more. The sufficient period of time is, for example, 8 days.

The surface adsorption layer 15 includes, for example, at least one selected from the group consisting of water adsorbed to the inner surfaces of the plurality of pores 12 and a polyether adsorbed to the inner surfaces of the plurality of pores 12. Water can effectively impart the ability to induce polarization of the polarization layer 130 to the surface adsorption layer 15. The polyether also can effectively impart the ability to induce polarization of the polarization layer 130 to the surface adsorption layer 15.

Water may form 1 or more and 4 or less monomolecular layers. The monomolecular layer has an ice-like structure and has immobility. Therefore, the surface adsorption layer 15 can stably maintain the structure thereof even when, for example, a high voltage is applied to the solid electrolyte.

When the surface adsorption layer 15 includes both water and the polyether, the surface adsorption layer 15 may have a multilayer structure composed of a water layer and polyether layer, or may have a structure in which water and the polyether exist together.

Examples of the polyether include polyethylene glycol, polypropylene glycol, and polytetramethylene glycol. Among the polyethers, polyethylene glycol is suitable for the solid electrolyte 10 of the present disclosure. Polyethylene glycol can effectively form the surface adsorption layer 15. A polyether having a structure in which ethylene glycol is polymerized is herein referred to as "polyethylene glycol" regardless of the molecular weight thereof. The term "polyethylene glycol" as used herein even includes high-molecular-weight polyethylene glycol called polyethylene oxide.

The surface adsorption layer 15 does not necessarily cover the entire inner surface of the pore 12. The inner surface of the pore 12 may include a portion not covered by the surface adsorption layer 15. The polarization layer 130 does not necessarily cover the entire inner surface of the surface adsorption layer 15. The inner surface of the surface adsorption layer 15 may include a portion not covered by the polarization layer 130.

Figure 2:
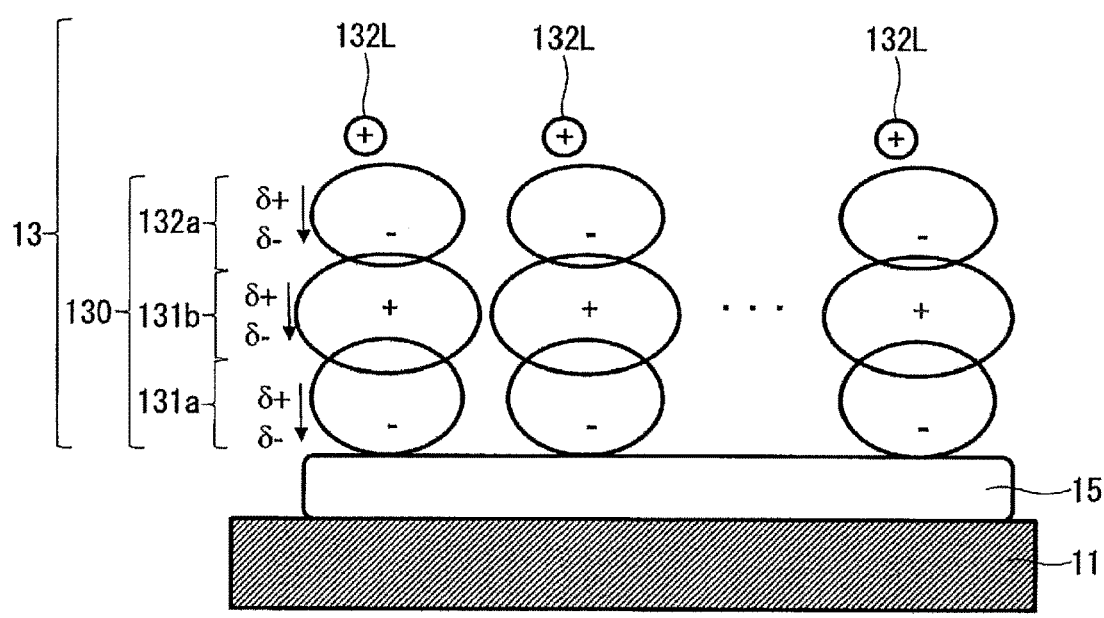
FIG. 2 schematically shows an example of a structure of a polarization layer.

FIG. 2 schematically shows an example of a structure of the polarization layer 130 in the vicinity of the inner surface of the pore 12 of the porous dielectric 11. A bis(trifluoromethanesulfonyl)imide anion may be described herein as "TFSI$^-$ ion". A 1-buthyl-1-methylpyrrolidinium cation may be described as "BMP$^+$ ion".

In the example shown in FIG. 2, the surface adsorption layer 15 is formed on the inner surface of the pore 12. The surface adsorption layer 15 is bonded to the porous dielectric 11. The polarization layer 130 is formed on the inner surface of the surface adsorption layer 15. The polarization layer 130 includes a first ion layer 131a, second ion layer 131b, and third ion layer 132a. The first ion layer 131a, second ion layer 131b, and third ion layer 132a are arranged on the surface adsorption layer 15 in this order. There is a metal ion 132L over the polarization layer 130. The polarization layer 130 improves the conductance of the metal ion 132L.

The first ion layer 131a is a layer including a plurality of first ions bonded to the surface adsorption layer 15. The plurality of first ions each have a first polarity. In the example shown in FIG. 2, the first ion layer 131a is composed of a plurality of TFSI$^-$ ions. These TFSI$^-$ ions are bonded to the surface adsorption layer 15. The TFSI$^-$ ion is the first ion, and a negative polarity is the first polarity.

The second ion layer 131b is a layer including a plurality of second ions bonded to the plurality of first ions. The plurality of second ions each have a second polarity being a polarity opposite to the first polarity. In the example shown in FIG. 2, the second ion layer 131b is composed of a plurality of BMP$^+$ ions. These BMP$^+$ ions are bonded to the plurality of TFSI$^-$ ions of the first ion layer 131a, respectively. The BMP$^+$ ion is the second ion, and a positive polarity is the second polarity.

The third ion layer 132a is a layer including a plurality of third ions bonded to the plurality of second ions. The plurality of third ions each have the first polarity. In the example shown in FIG. 2, the third ion layer 132a is composed of, for example, anions (for example, TFSI$^-$ ions) derived from the metal salt. These anions are bonded to the plurality of BMP$^+$ ions of the second ion layer 131b. The TFSI$^-$ ion is the third ion, and a negative polarity is the first polarity.

The plurality of first ions of the first ion layer 131a each can be an anion derived from the ionic compound or the metal salt. The plurality of second ions of the second ion layer 131b each can be a cation derived from the ionic compound. The plurality of third ions of the third ion layer 132a each can be an anion derived from the ionic compound or the metal salt. The form of the anion-cation bonding is, specifically, ionic bonding. The polarization layer 130 can be composed of the cation derived from the ionic compound and the anion derived from the ionic compound or metal salt.

It is inferred that in the solid electrolyte 10, the metal ion 132L such as a lithium ion can easily move over the polarization layer 130 (specifically, over the third ion layer 132a) by the following mechanism.

When the surface adsorption layer 15 is an adsorbed water layer, an atom (for example, an oxygen atom) of the first ion included in the first ion layer 131a is bonded to a hydrogen atom of the water molecule included in the adsorbed water layer.

At this moment, having an electrically weak positive charge, the hydrogen atom of an OH group included in the surface adsorption layer 15 draws a charge of the ion included in the first ion layer 131a. For example, when the ion included in the first ion layer 131a is the TFSI$^-$ ion, a $\pi$ electron of an S=O bond of the TFSI$^-$ ion is highly delocalized and thus drawn toward the surface adsorption layer 15 by an induced electric field. As a result, in the TFSI⁻ ion, a negative polarization charge is generated on the side closer to the surface adsorption layer 15 and a positive polarization charge is generated on the side away from the surface adsorption layer 15.

Next, when the ion included in the second ion layer 131*b* is the BMP⁺ ion, the BMP⁺ ion has a five-membered ring. A σ electron of the five-membered ring is highly localized. When the BMP⁺ ion is bonded to the TFSI⁻ ion included in the first ion layer 131*a*, charge imbalance of the TFSI⁻ ion induces drawing of the σ electron of the BMP⁺ ion toward the first ion layer 131*a* side. This causes charge imbalance of the BMP⁺ ion. Specifically, in the BMP⁺ ion, a negative polarization charge is generated on the side closer to the surface adsorption layer 15 and a positive polarization charge is generated on the side away from the surface adsorption layer 15.

The charge imbalance of the BMP⁺ ion included in the second ion layer 131*b* induces charge imbalance in the third ion layer 132*a*. When the ion included in the third ion layer 132*a* is the TFSI⁻ ion, a negative polarization charge is generated on the side closer to the surface adsorption layer 15 and a positive polarization charge is generated on the side away from the surface adsorption layer 15, in the TFSI⁻ ion.

The positive polarization charge on the surface of the third ion layer 132*a* can weaken the force by which the third ion layer 132*a* draws the metal ion 132L. In other words, the Coulomb interaction between the TFSI⁻ ion of the third ion layer 132*a* and the metal ion 132L is weakened. This is inferred to make it easy for the metal ion 132L to move over the third ion layer 132*a*.

When the third ion layer 132*a* includes an ion same as that of the first ion layer 131*a*, the charge imbalance in the third ion layer 132*a* is increased and the force by which the third ion layer 132*a* draws the metal ion 132L can be effectively reduced.

Figure 3:
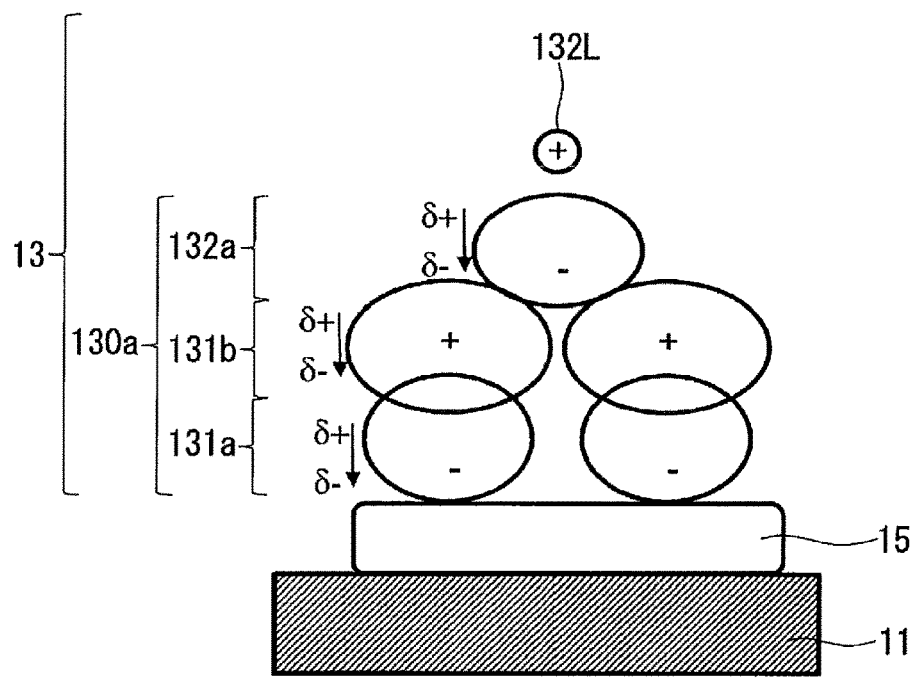
FIG. 3 schematically shows another example of a structure of a polarization layer.

FIG. 3 schematically shows another example of a structure of the polarization layer. As shown in FIG. 3, ions each constituting a layer of a polarization layer 130*a* are not bonded in one-to-one correspondence. The ions each constituting one of the layers of the polarization layer 130*a* may be bonded to each other according to the molar ratio between the ionic compound and metal salt.

Figure 4:
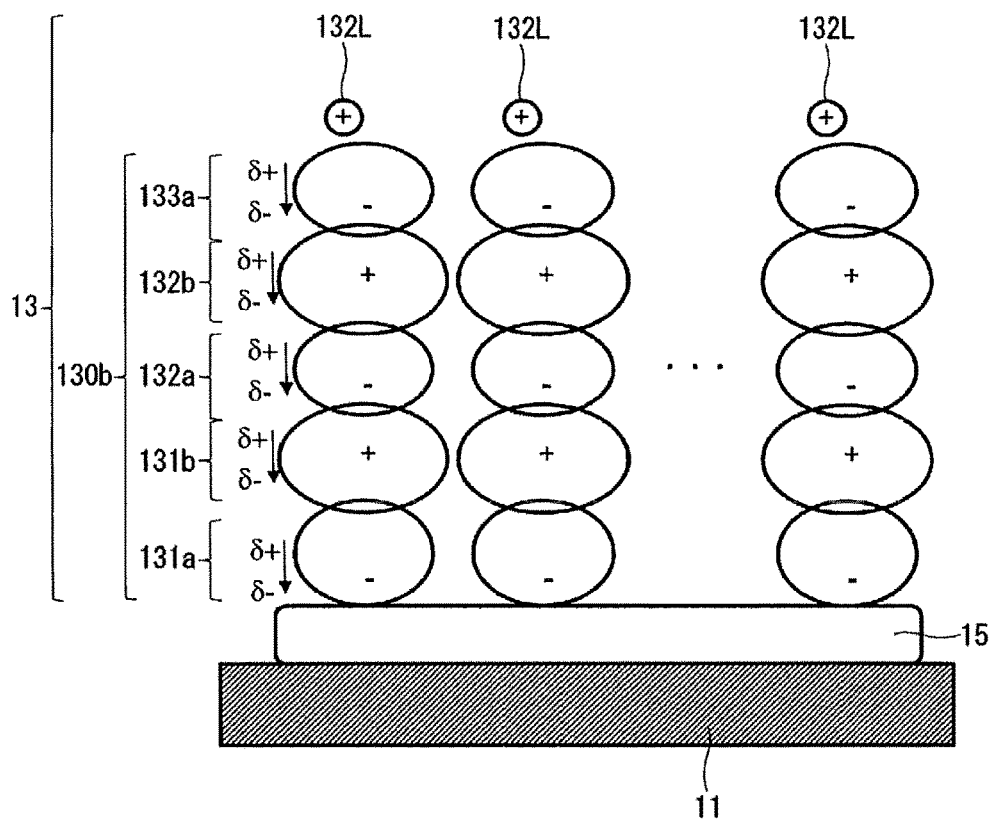
FIG. 4 schematically shows yet another example of a structure of a polarization layer.

FIG. 4 schematically shows yet another example of a structure of the polarization layer. As shown in FIG. 4, a polarization layer 130*b* includes the structure described with reference to FIG. 2 and further includes a fourth ion layer 132*b* and fifth ion layer 133*a*. The fourth ion layer 132*b* and fifth ion layer 133*a* are arranged in this order on the third ion layer 132*a*. There is the metal ion 132L over the fifth ion layer 133*a*.

As can be understood from FIG. 2 and FIG. 4, the number of layers included in the polarization layer is not particularly limited. The polarization layer may include a plurality of anion layers. The anions in the anion layers may be of the same type or may be of different types. The polarization layer may include a plurality of cation layers. The cations in the cation layers may be of the same type or may be of different types.

In the examples shown in FIG. 2, FIG. 3, and FIG. 4, the first ion layer 131*a* is an anion layer, the second ion layer 131*b* is a cation layer, and the third ion layer 132*a* is an anion layer. However, the anion and cation layers may be interchanged.

Figure 5:
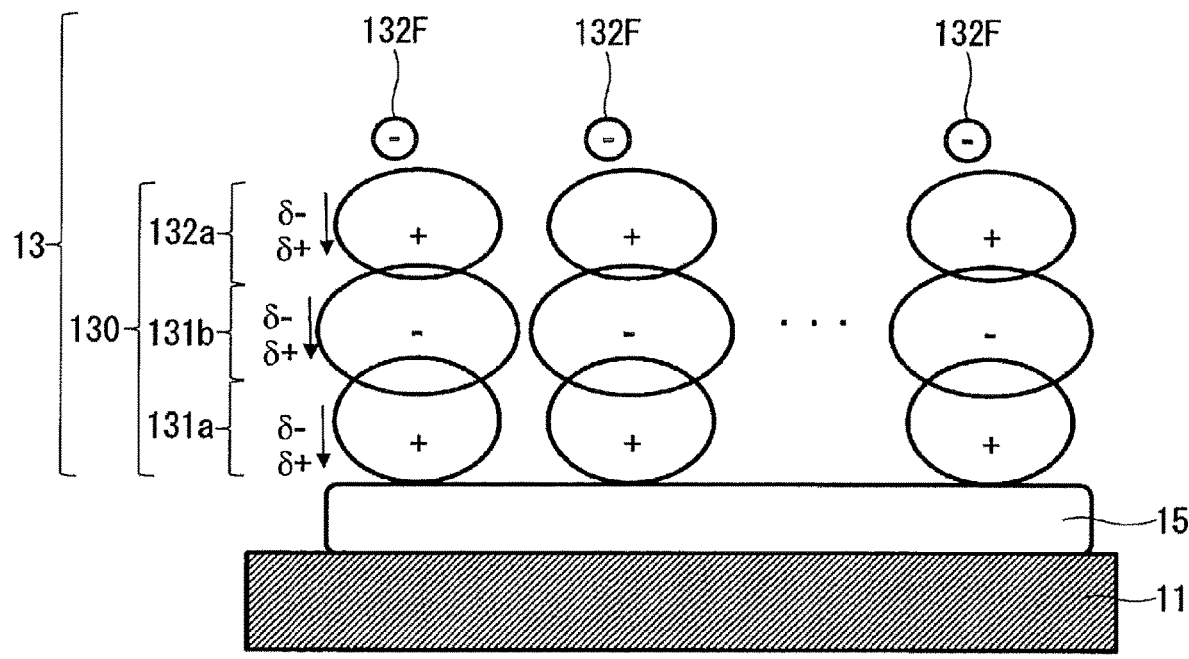
FIG. 5 schematically shows yet another example of a structure of a polarization layer.

In an example shown in FIG. 5, the first ion layer 131*a* is a cation layer, the second ion layer 131*b* is an anion layer, and the third ion layer 132*a* is a cation layer. The ion that moves over the surface of the polarization layer 130 is an anion 132F. Examples of the anion 132F include a fluoride ion (F⁻ ion) and hydride ion (H⁻ ion). In the example shown in FIG. 5, a metal fluoride or metal hydride is used as the metal salt. Examples of the metal fluoride include NaF and KF. Examples of the metal hydride include NaH, KH, and CaH₂.

Next, an example of a method for producing the solid electrolyte 10 will be described with reference to FIG. 6.

Figure 6:
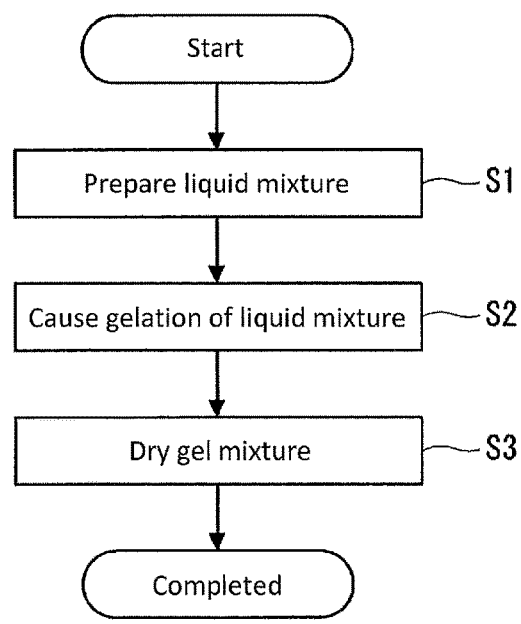
FIG. 6 is a flowchart showing an example of a method for producing the solid electrolyte according to the first embodiment.

The production method shown in FIG. 6 includes a step S1 of preparing a liquid mixture, step S2 of forming a gel mixture from the liquid mixture, and step S3 of drying the gel mixture. The solid electrolyte 10 described with reference to FIG. 1A can be produced efficiently by a sol-gel process.

In the step S1, a metal alkoxide, ionic compound, metal salt, water, and an organic solvent are mixed. For example, the metal alkoxide, ionic compound, metal salt, lithium salt, water, and the organic solvent are placed in a container and mixed. A liquid mixture can thus be obtained. The metal alkoxide is a precursor of the porous dielectric 11. A bipolar compound may be used instead of the ionic compound or in addition to the ionic compound.

With the use of a precursor including the functional group containing a halogen atom as a raw material, the structures described with reference to FIG. 1C and FIG. 1D can be efficiently produced. The precursor including the functional group containing a halogen atom is typically a metal alkoxide having the functional group containing a halogen atom. For example, when the functional group containing a halogen atom is bonded to a metal atom of the metal alkoxide, the functional group containing a halogen atom can remain in the porous dielectric 11 obtained by a hydrolysis reaction and condensation reaction of the metal alkoxide.

In the present embodiment, only the metal alkoxide having the functional group containing a halogen atom may be used as the metal alkoxide, or a combination of the metal alkoxide having the functional group containing a halogen atom and a metal alkoxide having no functional group containing a halogen atom may be used as the metal alkoxide.

Typical examples of the metal alkoxide having the functional group containing a halogen atom include a silicon alkoxide such as chloromethyltrimethoxysilane and chloromethyltriethoxysilane. With the use of such a silicon alkoxide, the porous dielectric 11 can be efficiently formed. Silicon is treated as a metal herein.

Examples of the silicon alkoxide having no functional group containing a halogen atom include tetraethyl orthosilicate (TEOS), tetramethyl orthosilicate (TMOS), methyltrimethoxysilane (MTMS), phenyltrimethoxysilane (PTMOS), phenyltriethoxysilane (PTEOS), 3-glycidyloxypropyltrimethoxysilane (GOTMS), 3-acryloxypropyltirmethoxysilane (APTMS), 3-aminopropyltriethoxysilane (APTES), and 3-aminopropyltrimethoxysilane (APTMOS). One silicon alkoxide or two or more silicon alkoxides selected from these silicon alkoxides can be used. The boiling point of TEOS is higher than the boiling point of TMOS. Since TEOS is unlikely to volatile in the preparation of the liquid mixture, the use of TEOS as a raw material makes it possible to precisely control the amount of silica obtained at the end.

Examples of silicon alkoxides having the functional group containing a halogen atom include substitution products of the above silicon alkoxides.

The term "substitution product" refers to: a silicon alkoxide in which a functional group bonded to a silicon atom of any of the above silicon alkoxides is substituted by the functional group containing a halogen atom; or a silicon alkoxide in which a hydrogen atom of a functional group bonded to a silicon atom of any of the above silicon alkoxides is substituted by a halogen atom. Examples of the functional group bonded to a silicon atom include a hydrogen atom, methyl group, ethyl group, methoxy group, ethoxy group, propoxy group, phenyl group, 3-glycidyloxypropyl group, 3-acryloxypropyl group, and 3-aminopropyl. For example, when a methyl group bonded to a silicon atom of methyltrimethoxysilane is substituted by a chloromethyl group, the resultant silicon alkoxide is chloromethyltrimethoxysilane. When one methoxy group of tetramethyl orthosilicate (TMOS) is substituted by a chloromethyl group, the resultant silicon alkoxide is chloromethyltrimethoxysilane. This way of thinking is applicable also to metal alkoxides other than silicon alkoxides.

The precursor of the porous dielectric 11 is not limited to the silicon alkoxide. Other metal alkoxides, such as aluminum tri-sec-butoxide (ATB), tetrabutyl orthotitanate (TBOT), and zirconium(IV) tetrabutoxide (ZTB), can also be used. A mixture of a plurality of metal alkoxides having different metal types may be used as the metal alkoxide.

Examples of the metal salt include the various materials described previously.

Examples of the ionic compound include the various materials described previously.

Water is required to hydrolyze the metal alkoxide, and is, for example, deionized water.

The organic solvent is required to allow the metal alkoxide, ionic compound, metal salt, and water to be uniformly mixed, and is, for example, an alcohol. Examples of the alcohol include methanol, ethanol, isopropanol, and 1-methoxy-2-propanol (PGME). One alcohol or two or more alcohols selected from these alcohols can be used.

The liquid mixture may contain a polyether as needed. The liquid mixture may contain another material.

In the step S2, a gel mixture is formed by gelation of the liquid mixture. For example, the container of the liquid mixture is sealed and stored at room temperature (for example, 25° C.) for about 3 to 23 days, during which the liquid mixture turns into a wet gel mixture. The time required for the gelation can be controlled by the amount of water, amount of the organic solvent, and storage temperature.

Specifically, the following reactions occur when the silicon alkoxide is used as the metal alkoxide. First, the silicon alkoxide is hydrolyzed to form silanol. Next, two silanol molecules undergo dehydration polycondensation to form a siloxane monomer. Then, a plurality of siloxane molecules undergo dehydration polycondensation to form a siloxane polymer. In this manner, the siloxane polymer forms a three-dimensional network to cause gelation of the liquid mixture.

In the step S3, the gel mixture is dried. The solid electrolyte 10 can thus be obtained. The gel mixture is dried, for example, using a vacuum dryer for 48 to 96 hours under the conditions of a pressure of 0.1 Pa or more and 200 Pa or less and a temperature of 15° C. or more and to 150° C. or less (ambient temperature). A pre-drying process may be carried out before the vacuum drying step to reduce occurrence of bumping and generation of air bubbles during the vacuum drying. In the pre-drying process, the gel mixture is heated, for example, using a hot plate provided on a local exhaust system for 24 to 96 hours under the conditions of atmospheric pressure and a temperature of 15° C. or more and 90° C. or less (surface temperature of the hot plate). Most of water and the organic solvent contained in the gel mixture can be evaporated by the pre-drying process. The pre-drying process may be carried out by leaving the gel mixture in air for 24 to 96 hours.

The solid electrolyte 10 may include the bipolar compound instead of the ionic compound or in addition to the ionic compound. The bipolar compound is a compound in which delocalized charges are distributed over a plurality of atoms spaced apart in a molecule. When the polarization layer 130 includes the bipolar compound, the element indicated by the reference character 131a in FIG. 2 corresponds to a portion constituting the bipolar compound and including an atom having a negative charge. The element indicated by the reference character 131b in FIG. 2 corresponds to a portion constituting the bipolar compound and including an atom having a positive charge.

Examples of the bipolar compound include 1,2-dipoles, 1,3-dipoles, 1,4-dipoles, and 1,5-dipoles. The bipolar compound is, for example, at least one selected from the group consisting of diazomethane, phosphonium ylide, and carbonyl oxide. In the step S1 shown in FIG. 6, the liquid mixture can be prepared using any of these bipolar compounds.

Second Embodiment

Figure 7:
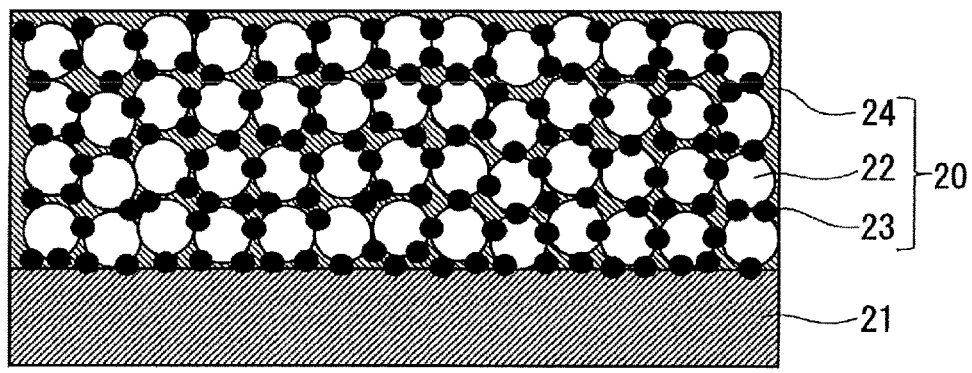
FIG. 7 schematically shows an example of a cross-sectional structure of an electrode according to a second embodiment.

FIG. 7 schematically shows an example of a cross-sectional structure of an electrode 20 according to a second embodiment. In FIG. 7, the electrode 20 is disposed on a current collector 21. The electrode 20 includes an electrode active material, conductive auxiliary agent, and solid electrolyte. Specifically, the electrode 20 includes active material particles 22, conductive auxiliary agent particles 23, and a solid electrolyte 24. The active material particles 22 are embedded in a matrix of the solid electrolyte 24 to be fixed. The conductive auxiliary agent particles 23 are also embedded in the matrix of the solid electrolyte 24 to be fixed. The shapes of the particles 22 and 23 are not particularly limited.

The current collector 21 is made of a conductive material. Examples of the conductive material include metals, conductive oxides, conductive nitrides, conductive carbides, conductive borides, and conductive resins.

The solid electrolyte 10 described in the first embodiment can be used as the solid electrolyte 24. Since the solid electrolyte 10 of the present disclosure has high ionic conductivity, the electrode 20 having excellent electrical characteristics can be obtained by the use of the solid electrolyte 10.

According to the present embodiment, the active material particles 22 (first particles) and conductive auxiliary agent particles 23 (second particles) are fixed in the matrix of the solid electrolyte 24. With such a configuration, the electrode 20 can reliably exercise the excellent electrical characteristics attributable to the high ionic conductivity of the solid electrolyte 24.

When the electrode active material used in the electrode 20 is a positive electrode active material, examples of the positive electrode active material include a lithium-containing transition metal oxide, vanadium oxide, chromium oxide, and lithium-containing transition metal sulfide. Examples of the lithium-containing transition metal oxide include $LiCoO_2$, $LiNiO_2$, $LiMnO_2$, $LiMn_2O_4$, $LiNiCoMnO_2$, $LiNiCoO_2$, $LiCoMnO_2$, $LiNiMnO_2$, $LiNiCoMnO_4$, $LiMnNiO_4$, $LiMnCoO_4$, $LiNiCoAlO_2$, $LiNiPO_4$, $LiCoPO_4$, $LiMnPO_4$, $LiFePO_4$, $Li_2NiSiO_4$, $Li_2CoSiO_4$, $Li_2MnSiO_4$, $Li_2FeSiO_4$, $LiNiBO_3$, $LiCoBO_3$, $LiMnBO_3$, and $LiFeBO_3$. Examples of the lithium-containing transition metal sulfide include $LiTiS_2$, $Li_2TiS_3$, and $Li_3NbS_4$. One positive electrode active material or two or more positive electrode active materials selected from these positive electrode active materials can be used.

When the electrode active material used in the electrode 20 is a negative electrode active material, examples of the negative electrode active material include a metal, semimetal, oxide, nitride, and carbon. Examples of the metal and semimetal include lithium, silicon, amorphous silicon, aluminum, silver, tin, antimony, and their alloys. Examples of the oxide include $Li_4Ti_5O_{12}$, $Li_2SrTi_6O_{14}$, $TiO_2$, $Nb_2O_5$, $SnO_2$, $Ta_2O_5$, $WO_2$, $WO_3$, $Fe_2O_3$, $CoO$, $MoO_2$, $SiO$, $SnBPO_6$, and their mixtures. Examples of the nitride include $LiCoN$, $Li_3FeN_2$, $Li_7MnN_4$, and their mixtures. Examples of the carbon include graphite, graphene, hard carbon, carbon nanotube, and their mixtures. One negative electrode active material or two or more negative electrode active materials selected from these negative electrode active materials can be used.

The conductive auxiliary agent is, for example, a conductive carbon. Examples of the conductive carbon include carbon black, fibrous carbon, graphite, ketjen black, and acetylene black. One conductive auxiliary agent or two or more conductive auxiliary agents selected from these conductive auxiliary agents can be used. The conductive auxiliary agent contributes to a sufficient reduction in the internal resistance of the electrode 20.

The electrode 20 may further include a binder. Examples of the binder include carboxymethyl cellulose (CMC) and styrene-butadiene rubber (SBR). One binder or two or more binders selected from these binders can be used. The binder is effective in maintaining the shape of the electrode 20.

Figure 8:
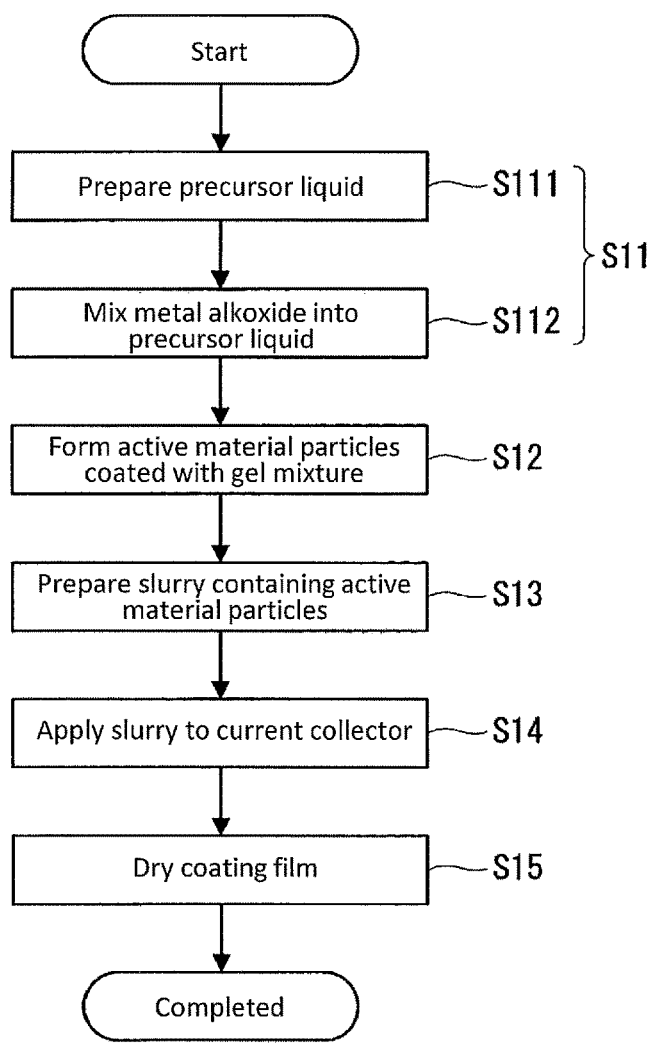
FIG. 8 is a flowchart showing an example of a method for producing the electrode according to the second embodiment.

Next, an example of a method for producing the electrode 20 will be described with reference to FIG. 8.

In a step S11, a liquid mixture containing the active material particles is prepared. The step S11 may include a sub-step S111 and sub-step S112. In the sub-step S111, a precursor liquid is prepared by mixing, for example, the ionic compound, metal salt, water, the organic solvent, and active material particles. The precursor liquid may further contain the polyether. In the sub-step S112, the metal alkoxide is mixed into the precursor liquid. A liquid mixture containing the active material particles can thus be obtained. In the sub-step S112, for example, the metal alkoxide is dropped into a container of the precursor liquid. The step S11 is the same step as the step S1 of the first embodiment, except that the active material particles are added to the liquid mixture.

As described in the first embodiment, only the metal alkoxide having the functional group containing a halogen atom may be used as the metal alkoxide, or a combination of the metal alkoxide having the functional group containing a halogen atom and another metal alkoxide may be used as the metal alkoxide.

In a step S12, the active material particles coated with a solid electrolyte is formed. In the step S12, for example, the operations same as those in the step S2 and step S3 of the first embodiment are carried out. Since the liquid mixture contains the active material particles, the gelation of the liquid mixture forms a gel mixture coating at least a portion of the surface of each active material particle. The active material particles coated with the gel mixture are dried to obtain the active material particles coated with the solid electrolyte.

In a step S13, a slurry containing the coated active material particles is prepared. The coated active material particles and conductive auxiliary agent particles are added to an electrolyte solution or a solvent and the materials are mixed. A slurry for producing the electrode can thus be obtained. A binder may be added to the slurry, if necessary. The conductive auxiliary agent may be added to the liquid mixture beforehand in the step S11. Examples of the electrolyte solution used for the preparation of the slurry include an electrolyte solution containing the metal salt and a carbonate ester. Examples of the carbonate ester include chain carbonates, cyclic carbonates, and their mixtures. The electrolyte solution can be obtained, for example, by dissolving $LiPF_6$ at a concentration of 1 mol/liter in a mixed solvent containing ethylene carbonate and diethyl carbonate at a volume ratio of 1:1. Examples of the solvent used for the preparation of the slurry include water and an organic solvent. Examples of the organic solvent include N-methylpyrrolidone (NMP).

In a step S14, the slurry is applied to a current collector to form a coating film. The method for applying the slurry is not particularly limited. The slurry is applied to the current collector, for example, by blade coating.

In a step S15, the coating film formed on the current collector is dried. The dried coating film may be extended by applying pressure so as to obtain the electrode 20 having a certain volume filling rate. The electrode 20 can thus be obtained. The coating film is dried, for example, using a vacuum dryer for 4 to 12 hours under the conditions of a pressure of 0.1 Pa or more and 200 Pa or less and a temperature of 80° C. or more and 150° C. or less (ambient temperature).

Figure 9:
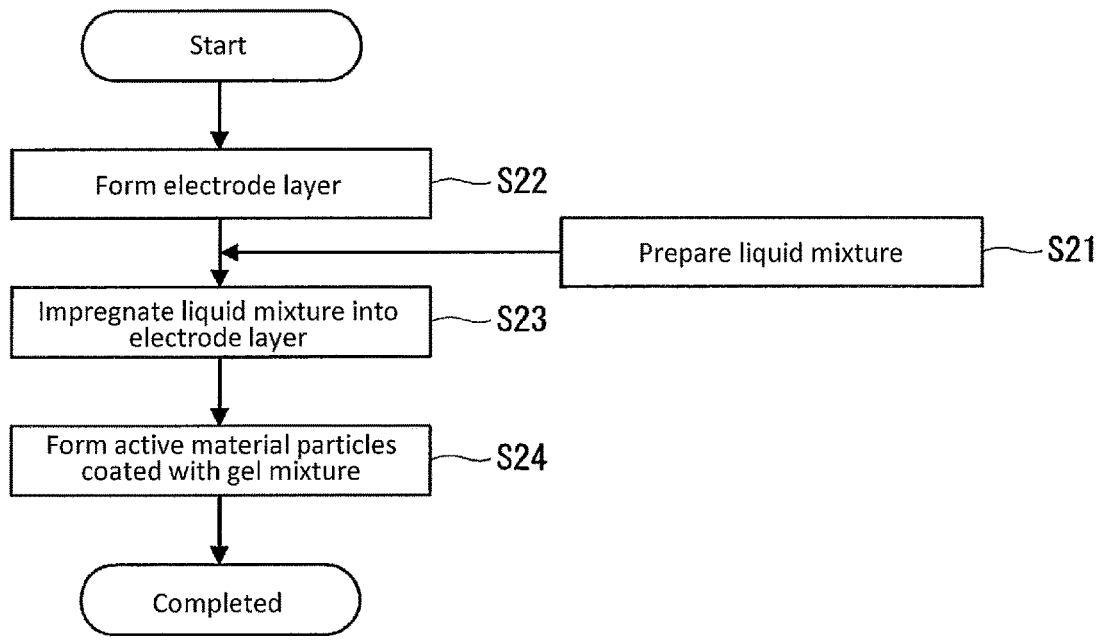
FIG. 9 is a flowchart showing another example of a method for producing the electrode according to the second embodiment.

Next, another example of a method for producing the electrode 20 will be described with reference to FIG. 9.

In a step S21, a liquid mixture is prepared. The step S21 is the same step as, for example, the step S1 of the first embodiment.

In a step S22, an electrode layer is formed on a current collector. The electrode layer can be obtained by applying a slurry containing the active material particles and conductive auxiliary agent particles to the current collector and drying the resultant coating film. The slurry may be prepared by adding an electrolyte solution or an organic solvent to the active material particles and conductive auxiliary agent particles and mixing the resultant mixture. In the step S22, the operations same as those in the step S14 and step S15 described with reference to FIG. 8 may be carried out.

The step S21 is independent of the step S22. The order of the step S21 and step S22 is not particularly limited.

In a step S23, the liquid mixture is impregnated into the electrode layer. To impregnate the liquid mixture into the electrode layer, the liquid mixture may be dropped on the electrode layer or the electrode layer may be immersed in the liquid mixture. The liquid mixture may partially undergo gelation before the impregnation of the electrode layer. For example, by storing the prepared liquid mixture at room temperature for several days, the liquid mixture slightly undergoes gelation. Such a liquid mixture may be impregnated into the electrode layer.

In a step S24, the active material particles coated with a solid electrolyte is formed. The liquid mixture impregnated into the electrode layer undergoes gelation, and the resultant gel mixture is dried. In the step S24, the operations same as those in the step S2 and step S3 of the first embodiment are carried out. The electrode 20 can thus be obtained.

Figure 10:
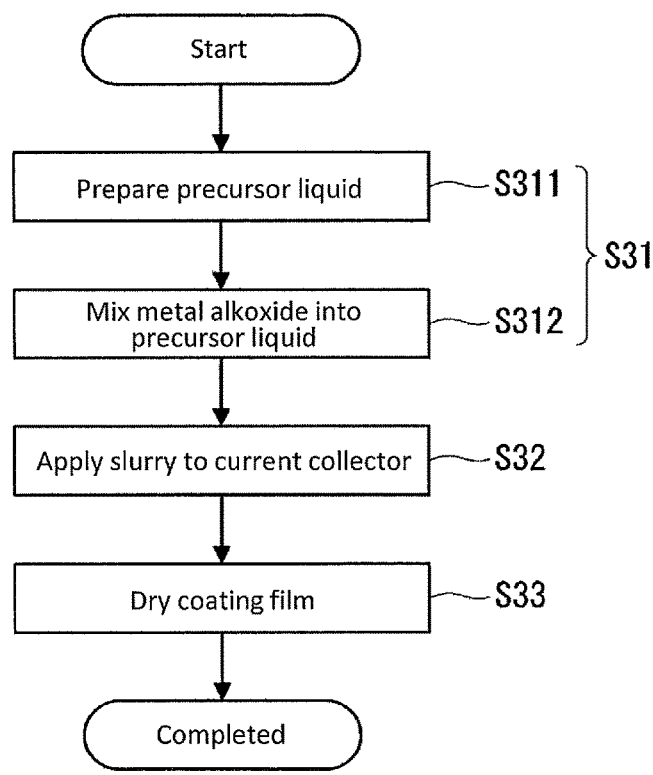
FIG. 10 is a flowchart showing yet another example of a method for producing the electrode according to the second embodiment.

Next, yet another example of a method for producing the electrode 20 will be described with reference to FIG. 10.

In a step S31, a slurry containing the active material particles is prepared. The step S31 may include a sub-step S311 and sub-step S312. In the sub-step S311, for example, the ionic compound, metal salt, water, the organic solvent, active material particles, conductive auxiliary agent particles, and binder are mixed to prepare a precursor liquid. The precursor liquid may include the polyether. In the sub-step S312, the metal alkoxide is mixed in the precursor liquid. The slurry for producing the electrode can thus be obtained. In the sub-step S312, the metal alkoxide is, for example, dropped into a container of the precursor liquid.

In a step S32, the slurry is applied to a current collector to form a coating film. The method of applying the slurry is not particularly limited. The slurry is applied to the current collector, for example, by blade coating.

In a step S33, the coating film formed on the current collector is dried. The hydrolysis reaction and dehydration polycondensation reaction previously described progress by the drying of the coating film, resulting in formation of a matrix that is a solid electrolyte around the active material particles and conductive auxiliary agent additive particles. The coating film may be stored at room temperature for a certain period of time (for example, 4 to 23 days) and subsequently dried under certain conditions. The coating film is dried, for example, using a vacuum dryer for 48 to 72 hours under the conditions of a pressure of 0.1 Pa or more and 200 Pa or less and a temperature of 15° C. or more and 150° C. or less (ambient temperature). The dried coating film may be extended by applying pressure so as to obtain the electrode 20 having a certain volume filling rate. The electrode 20 can thus be obtained.

Third Embodiment

Figure 11:
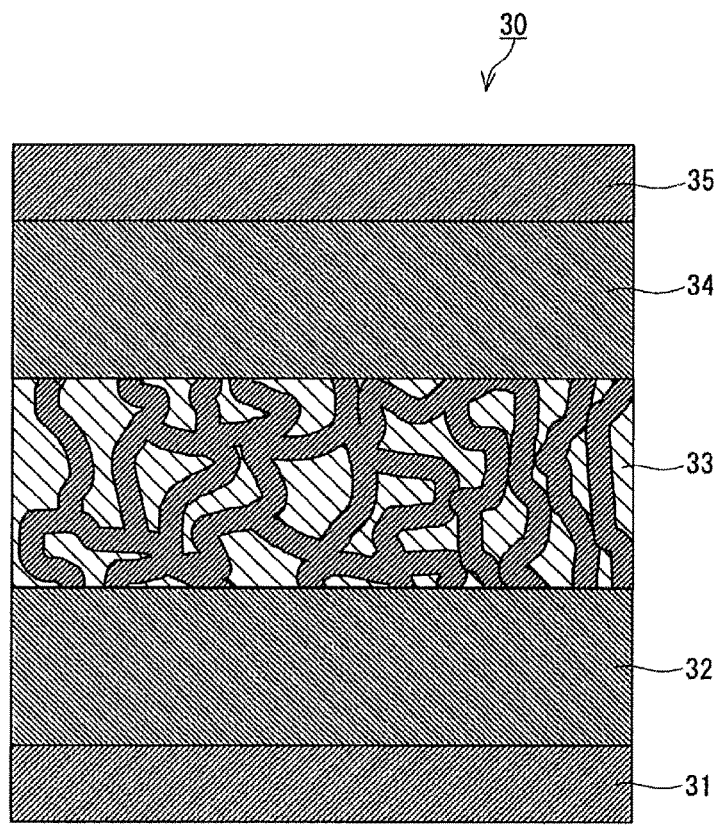
FIG. 11 schematically shows an example of a cross-sectional structure of a power storage device according to a third embodiment.

FIG. 11 schematically shows an example of a cross-sectional structure of a power storage device 30 according to a third embodiment. In FIG. 11, the power storage device 30 includes a current collector 31, positive electrode 32, solid electrolyte 33, negative electrode 34, and current collector 35. The current collector 21 described in the second embodiment can be used as the current collectors 31 and 35. The positive electrode 32 includes, for example, the positive electrode active material described in the second embodiment. The negative electrode 34 includes, for example, the negative electrode active material described in the second embodiment.

The solid electrolyte 33 is disposed between the positive electrode 32 and negative electrode 34. The solid electrolyte 10 described in the first embodiment can be used as the solid electrolyte 33. Since the solid electrolyte 10 of the present disclosure has high ionic conductivity, the power storage device 30 having excellent electrical characteristics can be obtained with the use of the solid electrolyte 10.

Fourth Embodiment

Figure 12:
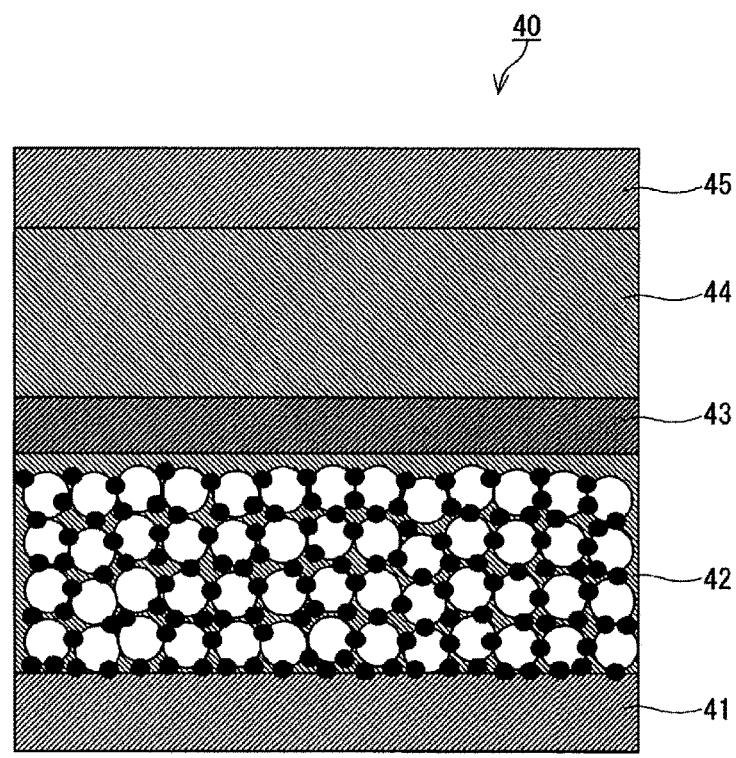
FIG. 12 schematically shows an example of a cross-sectional structure of a power storage device according to a fourth embodiment.

FIG. 12 shows an example of a cross-sectional structure of a power storage device 40 according to a fourth embodiment. In FIG. 12, the power storage device 40 includes a current collector 41, positive electrode 42, solid electrolyte 43, negative electrode 44, and current collector 45. The current collector 21 described in the second embodiment can be used as the current collectors 41 and 45. The electrode 20 described in the second embodiment can be used as the positive electrode 42. The negative electrode 44 includes, for example, the negative electrode active material described in the second embodiment.

The solid electrolyte 43 is disposed between the positive electrode 42 and negative electrode 44. The solid electrolyte 10 described in the first embodiment can be used as the solid electrolyte 43. Alternatively, the solid electrolyte 43 may be a different solid electrolyte. Examples of the different solid electrolyte include an inorganic solid electrolyte and polymer electrolyte. Examples of the inorganic solid electrolyte include an inorganic oxide and inorganic sulfide. Examples of the inorganic oxide include LiPON, $LiAlTi(PO_4)_3$, $LiAlGeTi(PO_4)_3$, LiLaTiO, LiLaZrO, $Li_3PO_4$, $Li_2SiO_2$, $Li_3SiO_4$, $Li_3VO_4$, $Li_4SiO_4$—$Zn_2SiO_4$, $Li_4GeO_4$—$Li_2GeZnO_4$, $Li_2GeZnO_4$—$Zn_2GeO_4$, and $Li_4GeO_4$—$Li_3VO_4$. Examples of the inorganic sulfide include $Li_2S$—$P_2S_5$, $Li_2S$—$P_2S_5$—LiI, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—GeS, $Li_2S$—$P_2S_5$—ZnS, $Li_2S$—$P_2S_5$—GaS, $Li_2S$—$GeS_2$, $Li_2S$—$SiS_2$—$Li_3PO_4$, $Li_2S$—$SiS_2$—LiPO, $Li_2S$—$SiS_2$—LiSiO, $Li_2S$—$SiS_2$—LiGeO, $Li_2S$—$SiS_2$—LiBO, $Li_2S$—$SiS_2$—LiAlO, $Li_2S$—$SiS_2$—LiGaO, $Li_2S$—$SiS_2$—LiInO, $Li_4GeS_4$—$Li_3PS_3$, $Li_4SiS_4$—$Li_3PS_4$, and $Li_3PS_4$—$Li_2S$. Examples of the polymer electrolyte include fluorine resins, polyethylene oxide, polyacrylonitrile, polyacrylates, their derivatives, and their copolymers.

The solid electrolyte 43 may be omitted when sufficient electron insulation properties can be ensured in the power storage device 40. For example, after the electrode 20 as described with reference to FIG. 7 is prepared, a liquid mixture as described above is applied to a surface of the electrode 20 to form a coating film. A thin solid electrolyte layer can be formed on the electrode 20 by gelation and drying of the coating film. When this thin layer is sufficient to prevent a short circuit between the positive electrode and negative electrode, no solid electrolyte serving as a separator is separately needed.

In the power storage device 40 shown in FIG. 12, the solid electrolyte-including electrode of the present disclosure is employed only as the positive electrode 42.

Fifth Embodiment

Figure 13:
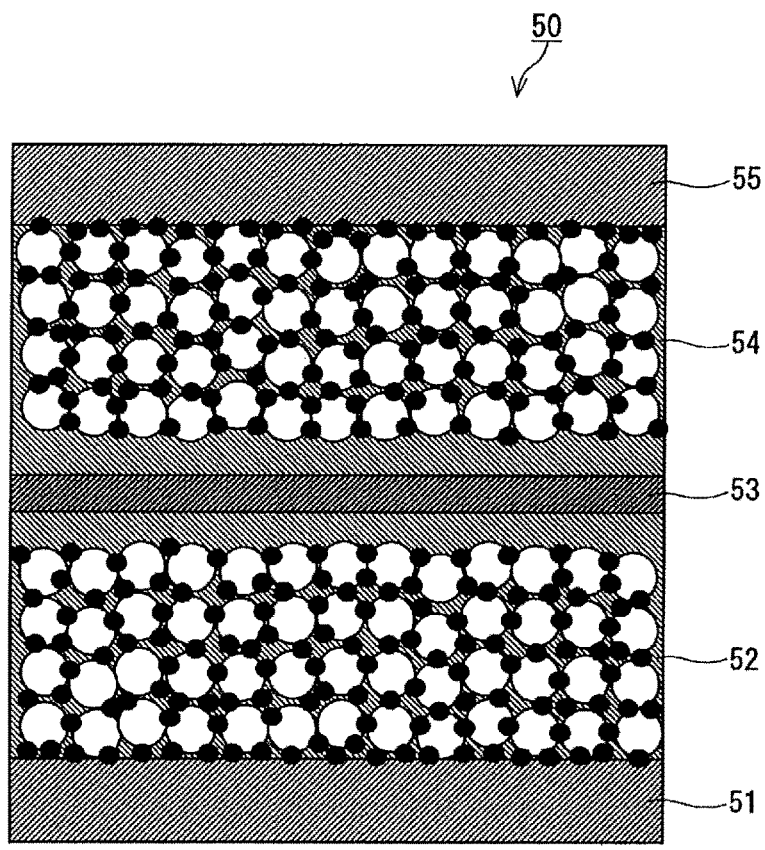
FIG. 13 schematically shows an example of a cross-sectional structure of a power storage device according to a fifth embodiment.

FIG. 13 shows an example of a cross-sectional structure of a power storage device 50 according to a fifth embodiment. In FIG. 13, the power storage device 50 includes a current collector 51, positive electrode 52, solid electrolyte 53, negative electrode 54, and current collector 55. The current collector 21 described in the second embodiment can be used as the current collectors 51 and 55. The electrode 20 described in the second embodiment can be used as the positive electrode 52 and negative electrode 54. The solid electrolyte 53 is disposed between the positive electrode 52 and negative electrode 54. The solid electrolyte 10 described in the first embodiment can be used as the solid electrolyte 53. Alternatively, the solid electrolyte 53 may be a different solid electrolyte. In the present embodiment, the solid electrolyte-including electrode of the present disclosure is employed as both the positive electrode 52 and negative electrode 54. The solid electrolyte-including electrode of the present disclosure may be employed only as the negative electrode 54.

According to the fourth and fifth embodiments, the electrode 20 of the present disclosure is used as at least one selected from the positive electrode and negative electrode. The electrode 20 includes the solid electrolyte 10 of the present disclosure. Since the solid electrolyte 10 has high ionic conductivity, a power storage device having excellent electrical characteristics can be obtained by the use of the solid electrolyte 10.

Examples (Sample 1a)

1.02 ml of BMP-TFSI, 0.324 g of Li-TFSI, a predetermined amount of a silicon alkoxide, 1.0 ml of PGME, and 0.5 ml of water were placed in a glass container and mixed to obtain a liquid mixture. A mixture of TEOS and chloromethyltrimethoxysilane (Cl-TMOS) was used as the silicon alkoxide. The proportion of chloromethyltrimethoxysilane to the total amount of the silicon alkoxide was 10 mol %. The mixing ratio between the silicon alkoxide and BMP-TFSI was silicon alkoxide:BMP-TFSI=1.0:1.5 on a molar basis.

Next, the glass container was sealed and the liquid mixture was stored at 25° C. The liquid mixture turned into a wet gel mixture in 5 to 17 days.

Then, the gel mixture was pre-dried using a hot plate equipped with a desiccator at 40° C. and 80 kPa for 96 hours. Afterwards, the gel mixture was put in a vacuum oven and dried at 25° C. and 0.1 Pa or less for 72 hours. A solid electrolyte of Sample 1a was thus obtained.

(Sample 1b to Sample 1e) Solid electrolytes of Sample 1b to Sample 1e were produced in the same manner as for Sample 1a, except that the proportion of chloromethyltrimethoxysilane to the total amount of the silicon alkoxide was changed to 25 mol %, 75 mol %, 90 mol %, and 100 mol % respectively.

The solid electrolytes of Sample 1a to Sample 1e were transferred into a glove box (humidity <0.0005% RH) and measured for the ionic conductivity at about 23° C. to 24° C. by an AC impedance method.

(Reference Sample 1)

An electrolyte solution containing only BMP-TFSI and Li-TFSI was prepared as an electrolyte of Reference Sample 1. The mixing ratio between BMP-TFSI and Li-TFSI was BMP-TFSI:Li-TFSI=3.0:1.0 on a molar basis. The ionic conductivity of the electrolyte of Reference Sample 1 at about 23° C. to 24° C. was measured by an AC impedance method. The ionic conductivity of the electrolyte of Reference Sample 1 is 0.6 mS/cm.

Figure 14:
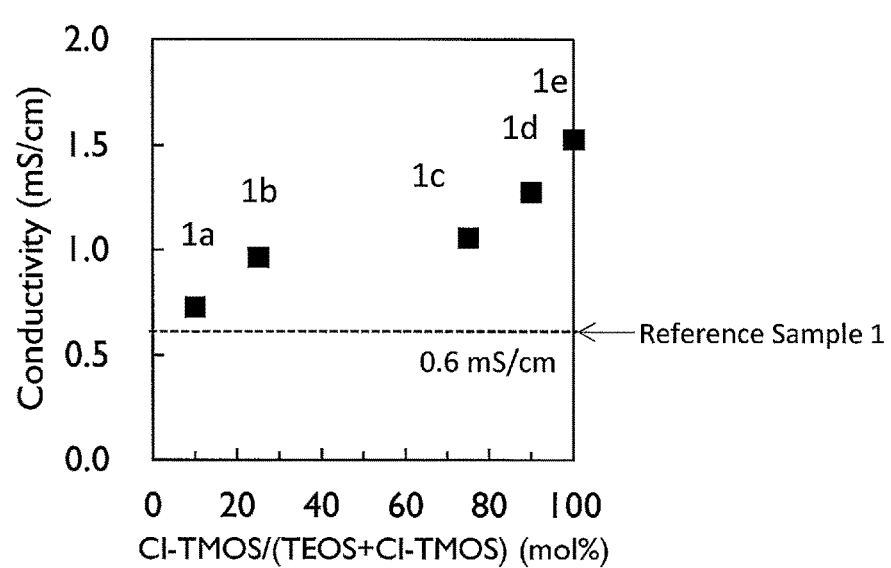
FIG. 14 is a graph showing the relationship between the ionic conductivity of solid electrolytes of Sample 1a to Sample 1e and the amount of Cl-TMOS added for the solid electrolytes of Sample 1a to Sample 1e.

FIG. 14 shows the relationship between the ionic conductivity of the solid electrolytes of Sample 1a to Sample 1e and the amount of Cl-TMOS added for the solid electrolytes of Sample 1a to Sample 1e. The vertical axis represents the ionic conductivity. The horizontal axis represents the proportion of chloromethyltrimethoxysilane (Cl-TMOS) to the total amount of the silicon alkoxide. The ionic conductivity increases with increasing proportion of Cl-TMOS. All of the solid electrolytes of Sample 1a to Sample 1e exhibit ionic conductivities higher than the ionic conductivity of Reference Sample 1.

(Sample 2a)

The mixing ratio between BMP-TFSI and Li-TFSI was BMP-TFSI:Li-TFSI=3.0:1.0 on a molar basis. Only Cl-TMOS was used as the silicon alkoxide. The ratio of BMP-TFSI to Cl-TMOS was 0.25 on a molar basis. A solid electrolyte of Sample 2a was produced in the same manner as for Sample 1a, except for these changes.

(Sample 2b to Sample 2f)

Solid electrolytes of Sample 2b to Sample 2f were produced in the same manner as for Sample 2a, except that the ratio of BMP-TFSI to Cl-TMOS was changed to 0.5, 0.75, 1.0, 1.5, and 2.5 respectively on a molar basis.

Figure 15:
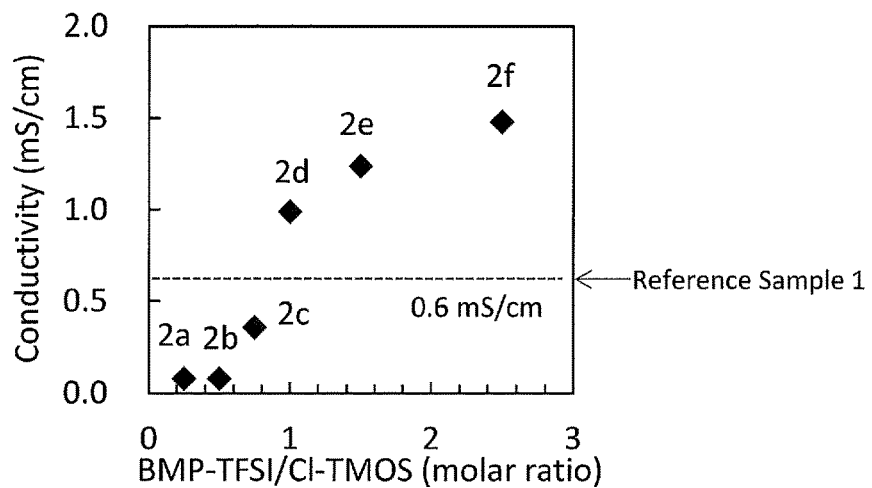
FIG. 15 is a graph showing the relationship between the ionic conductivity of solid electrolytes of Sample 2a to Sample 2f and the molar ratio of an ionic liquid to Cl-TMOS for the solid electrolytes of Sample 2a to Sample 2f.

FIG. 15 shows the relationship between the ionic conductivity of the solid electrolytes of Sample 2a to Sample 2f and the molar ratio of BMP-TFSI to Cl-TMOS for the solid electrolytes of Sample 2a to Sample 2. The vertical axis represents the ionic conductivity. The horizontal axis represents the molar ratio of BMP-TFSI to Cl-TMOS. The ionic conductivity increases with increasing molar ratio of BMP-TFSI to Cl-TMOS. The ionic conductivities of Sample 2d, Sample 2e, and Sample 2f are higher than the ionic conductivity of Reference Sample 1. That is, the ionic conductivities of the solid electrolytes for which BMP-TFSI/Cl-TMOS is 1.0 or more are higher than the conductivity of Reference Sample 1. The BMP-TFSI/Cl-TMOS value can be determined to be 1.0 or more on a molar basis. The upper limit of the BMP-TFSI/Cl-TMOS value is not particularly limited and is, for example, 2.5.

(Reference Sample 2)

A solid electrolyte of Reference Sample 2 was produced in the same manner as for Sample 1a, except that only TEOS was used as the silicon alkoxide and that the mixing ratio of the materials was changed to TEOS:BMP-TFSI:Li-TFSI=2.0:3.0:1.0 on a molar basis.

Figure 16:
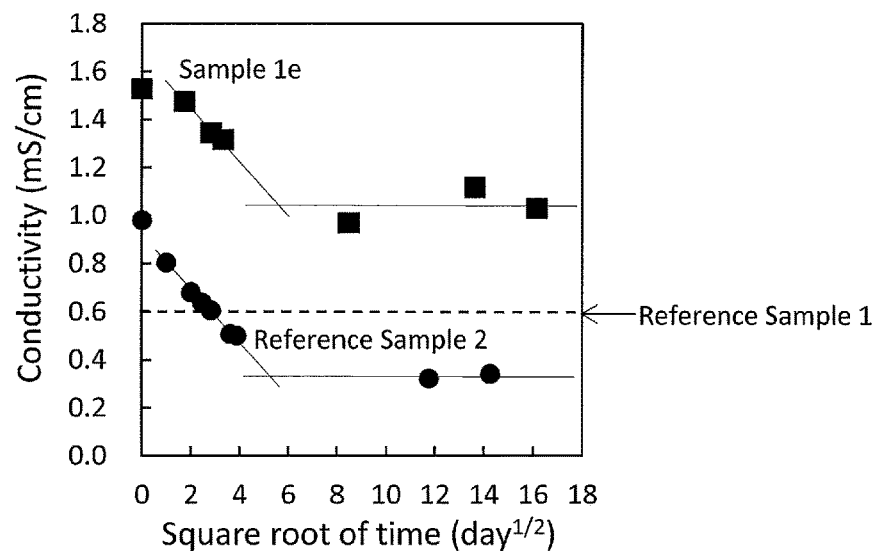
FIG. 16 is a graph showing time-dependent ionic conductivity changes occurring during storage of the solid electrolyte of Sample 1e and an electrolyte of Reference Sample 2 in a low-humidity environment.

FIG. 16 shows time-dependent ionic conductivity changes occurring during storage of the solid electrolyte of Sample 1e and the solid electrolyte of Reference Sample 2 in a low-humidity environment. The vertical axis represents the ionic conductivity. The horizontal axis represents the one-half power of a period of time (days) following the production. The dotted line represents the ionic conductivity (0.6 mS/cm) of the electrolyte of Reference Sample 1. Immediately after the production, the ionic conductivity of the solid electrolyte of Reference Sample 2 was higher than the ionic conductivity of the electrolyte of Reference Sample 1. By storing the solid electrolyte of Reference Sample 2 in a low-humidity environment (<0.0005% RH), the ionic conductivity thereof gradually decreased. When the equilibrium state was reached after a 30-day or longer storage, the solid electrolyte of Reference Sample 2 exhibited an ionic conductivity lower than the ionic conductivity of the electrolyte of Reference Sample 1.

Immediately after the production, the ionic conductivity of the solid electrolyte of Sample 1e, on the other hand, was higher than the ionic conductivities of the electrolytes of Reference Sample 1 and Reference Sample 2. By storing the solid electrolyte of Sample 1e in a low-humidity environment (<0.0005% RH), the ionic conductivity of the solid electrolyte of Sample 1e gradually decreased. When the equilibrium state was reached after a 30-day or longer storage, the solid electrolyte of Sample 1e still exhibited an ionic conductivity higher than the ionic conductivities of the electrolytes of Reference Sample 1 and Reference Sample 2.

The time-dependent ionic conductivity changes are inferred to be attributable to the mechanism described below.

The solid electrolyte of Reference Sample 2 has an adsorbed water layer as the surface adsorption layer. The adsorbed water layer of the solid electrolyte of Reference Sample 2 is thick and dense immediately after the production. Thus, ionic polarization is strongly induced in the polarization layer, and the force by which the $TFSI^-$ ion directly below the $Li^+$ ion draws the $Li^+$ ion is weakened to make it easy for the $Li^+$ ion to move. Consequently, the solid electrolyte of Reference Sample 2 exhibits a high ionic conductivity.

However, storing the solid electrolyte of Reference Sample 2 in a low-humidity environment (<0.0005% RH) decreases the thickness and density of the adsorbed water layer thereof. The mobility of the $Li^+$ ion decreases to the same level as that in the electrolyte of Reference Sample 1 having no surface adsorption layer. As a result, the solid electrolyte of Reference Sample 2 as a whole exhibits an ionic conductivity lower than the ionic conductivity (0.6 mS/cm) of the electrolyte of Reference Sample 1.

As is the case for Reference Sample 2, storing the solid electrolyte of Sample 1e in a low-humidity environment (<0.0005% RH) decreases the thickness and density of the adsorbed water layer thereof. In spite of that, since the surface of $SiO_2$ is modified by Cl, the molecules in the ionic liquid are strongly drawn due to the polarity of Cl. As a result, the state where ionic polarization is strongly induced in the polarization layer can be maintained, and thus the force by which the TFSI⁻ ion directly below the Li⁺ ion draws the Li⁺ ion is weakened to make it easy for the Li⁺ ion to move. Therefore, the solid electrolyte of Sample 1e maintains a high ionic conductivity even in a low-humidity environment.

Figure 17:
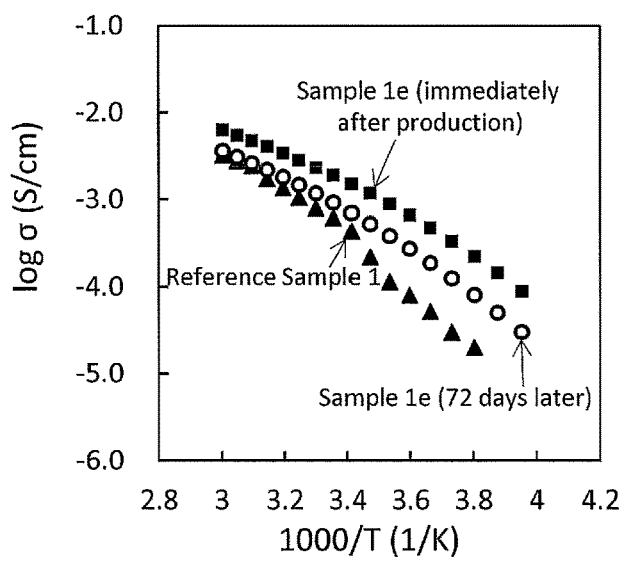
FIG. 17 is a graph showing the temperature dependence of the ionic conductivities of the solid electrolyte of Sample 1e and an electrolyte of Reference Sample 1.

FIG. 17 shows the temperature dependence of the ionic conductivities of the solid electrolyte of Sample 1e and the electrolyte of Reference Sample 1. The vertical axis represents the natural logarithm of the ionic conductivity. The horizontal axis represents 1000/T (T represents the temperature (K)). Around measurement temperatures from 283 K to 293 K, i.e., around 3.5 on the horizontal axis, the ionic conductivity of the electrolyte of Reference Sample 1 shows a significant change attributable to liquefaction or solidification of the ionic liquid. On the other hand, no rapid change in ionic conductivity is observed for the solid electrolyte of Sample 1e. This is presumably because the molecules in the ionic liquid are adsorbed to $SiO_2$ modified by Cl to form a phase different from a pure liquid phase and pure solid phase.

(Ft-Ir Measurement)

After the solid electrolyte of Sample 1e was stored in a low-humidity environment (<0.0005% RH) for 284 days, FT-IR measurement was carried out for the solid electrolyte of Sample 1e to confirm that the molecules in the ionic liquid were adsorbed. FT-IR measurement was carried out also for the electrolyte of Reference Sample 1.

Figure 18:
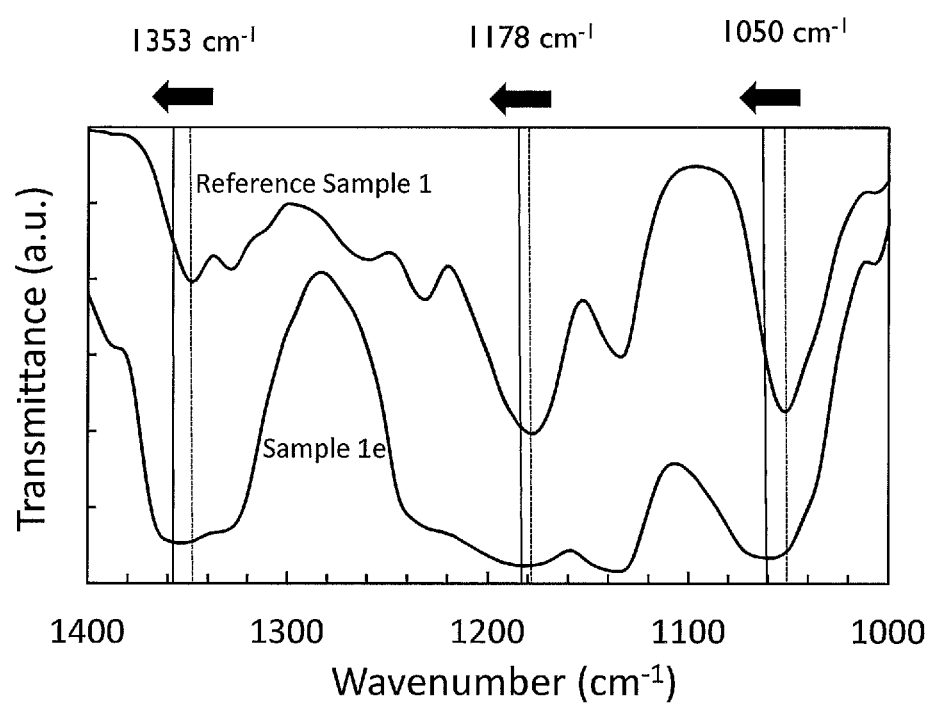
FIG. 18 is a graph showing FT-IR measurement results for the solid electrolyte of Sample 1e and the electrolyte of Reference Sample 1 in the wavenumber range of 1000 $cm^{-1}$ to 1400 $cm^{-1}$.

FIG. 18 shows the FT-IR measurement results for the solid electrolyte of Sample 1e and the electrolyte of Reference Sample 1 in the wavenumber range of 1000 cm⁻¹ to 1400 cm⁻¹. Vertical solid lines indicate the positions of peaks shown by Sample 1e. Vertical dotted lines indicate the positions of peaks shown by Reference Sample 1. Arrows indicate shifts of the peak positions. The peaks are attributable to a stretching vibration mode of an O=S=O bond in a TFSI anion molecule contained in the ionic liquids. For Reference Sample 1, the peaks are observed at positions 1050 cm⁻¹, 1178 cm⁻¹, and 1353 cm⁻¹. For Sample 1e, the peaks shift to the low energy side. The reason of this is presumably that an S atom having a relatively positive polarity and a Cl atom on the surface of $SiO_2$ formed a bond. That is, the peak shifts suggest adsorption of the TFSI anion molecule to the surface of $SiO_2$.

(Solid-State NMR Measurement)

Figure 19A:
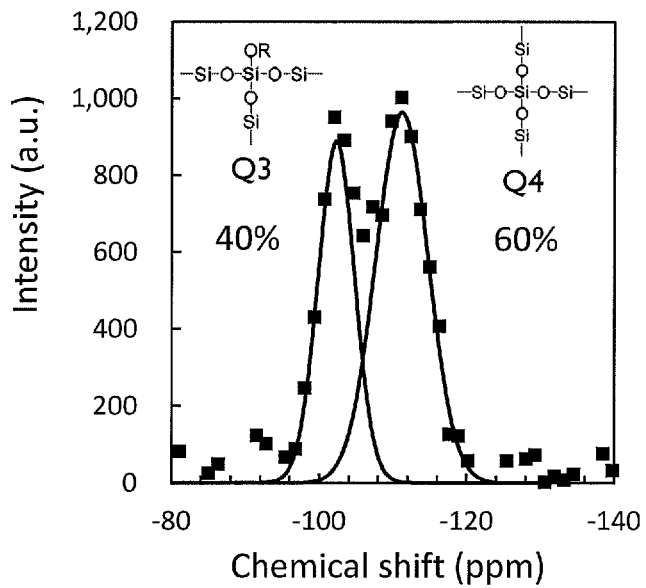
FIG. 19A is a graph showing solid-state NMR measurement results for the solid electrolyte of Reference Sample 2 in the chemical shift range of −80 ppm to −140 ppm.
Figure 19B:
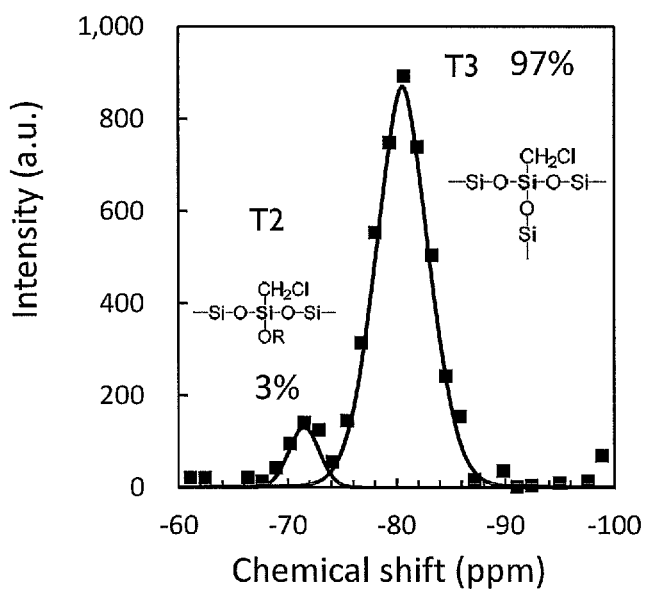
FIG. 19B is a graph showing solid-state NMR measurement results for the solid electrolyte of Sample 1e in the chemical shift range of −60 ppm to −100 ppm.

Solid-state $^{29}$Si-NMR measurement was performed for the porous dielectrics Reference Sample 2 and Sample 1e to evaluate the conditions of the inner surfaces of the pores of the porous dielectrics. FIG. 19A shows the solid-state NMR measurement results for the solid electrolyte of Reference Sample 2 in the chemical shift range of −80 ppm to −140 ppm. FIG. 19B shows the solid-state NMR measurement results for the solid electrolyte of Sample 1e in the chemical shift range of −60 ppm to −100 ppm.

As shown in FIG. 19A, spectra shown by Reference Sample 2 have two peaks Q3 and Q4. The peak Q3 reflects an OH bond or alkyl group remaining as a surface end group due to failure of formation of a complete Si—O bond. The peak Q4 is a peak derived from a complete Si—O bond. The area ratio calculated from the result of fitting was Q3:Q4=40%:60%. This indicates that the molar ratio of the surface end group to Si reaches up to 40%.

As shown in FIG. 19B, spectra shown by Sample 1e have two peaks T2 and T3. No other peaks such as Q3 and Q4 were detected. Each of the peaks T2 and T3 is a peak derived from a chlorine atom. The spectra in FIG. 19B indicate that 100% of the —CH₂Cl group remains even after the production of the Sample. This indicates that the molar ratio of a Cl end group as the surface end group to Si reaches up to 100%.

The measurement results in FIG. 19A and FIG. 19B suggest the possibility that the density of the surface end group in Sample 1e is higher than the density of the surface end group in Reference Sample 2.

INDUSTRIAL APPLICABILITY

The techniques of the present disclosure are useful for power storage devices such as lithium-ion secondary batteries.

What is claimed is:

1. A solid electrolyte, comprising:
   a porous dielectric having a plurality of pores interconnected mutually; and
   an electrolyte comprising a metal salt and at least one selected from the group consisting of an ionic compound and a bipolar compound and at least partially filling an interior of the plurality of pores, wherein
   inner surfaces of the plurality of pores of the porous dielectric are at least partially modified by a functional group containing a halogen atom, and
   the halogen atom is a chlorine atom.

2. The solid electrolyte according to claim 1, wherein the chlorine atom is present at the end of the functional group.

3. The solid electrolyte according to claim 1, further comprising a surface adsorption layer adsorbed to the inner surfaces of the plurality of pores to induce polarization.

4. The solid electrolyte according to claim 1, wherein
   the electrolyte comprises a polarization layer adsorbed to the inner surface of the pore of the porous dielectric or an inner surface of the surface adsorption layer,
   the polarization layer comprises a first ion layer, a second ion layer, and a third ion layer,
   the first ion layer is a layer comprising a plurality of first ions bonded to the porous dielectric or the surface adsorption layer,
   the plurality of first ions each have a first polarity,
   the second ion layer is a layer comprising a plurality of second ions bonded to the plurality of first ions,
   the plurality of second ions each have a second polarity being a polarity opposite to the first polarity,
   the third ion layer is a layer comprising a plurality of third ions bonded to the plurality of second ions, and
   the plurality of third ions each have the first polarity.

5. The solid electrolyte according to claim 4, wherein
   the plurality of first ions are each an anion derived from the ionic compound or the metal salt,
   the plurality of second ions are each a cation derived from the ionic compound, and
   the plurality of third ions are each an anion derived from the ionic compound or the metal salt.

6. The solid electrolyte according to claim 1, wherein the metal salt is a lithium salt.

7. The solid electrolyte according to claim 6, wherein the lithium salt comprises lithium bis(trifluoromethanesulfonyl) imide.

8. The solid electrolyte according to claim 1, wherein the ionic compound is an ionic liquid.

9. The solid electrolyte according to claim 8, wherein the ionic liquid comprises a bis(trifluoromethanesulfonyl)imide anion.

10. The solid electrolyte according to claim 9, wherein the ionic liquid comprises 1-butyl-1-methylpyrrolidinium bis(trifluoromethanesulfonyl)imide.

11. The solid electrolyte according to claim 1, wherein the porous dielectric is porous silica.

12. The solid electrolyte according to claim 1, wherein
the porous dielectric forms a single layer, and
an outer boundary of the solid electrolyte is defined by the porous dielectric.

13. An electrode, comprising:
the solid electrolyte according to claim 1; and
an electrode active material.

14. The electrode according to claim 13, further comprising at least one selected from a conductive auxiliary agent and a binder.

15. A power storage device, comprising:
a positive electrode; and
a negative electrode, wherein
at least one selected from the positive electrode and the negative electrode is the electrode according to claim 13.

16. A power storage device, comprising:
a positive electrode;
a negative electrode; and
the solid electrolyte according to claim 1.

17. A method for producing the solid electrolyte described in claim 1, comprising:
mixing a precursor of a porous dielectric, at least one selected from the group consisting of an ionic compound and a bipolar compound, a metal salt, water, and an organic solvent to prepare a liquid mixture;
causing gelation of the liquid mixture to form a gel mixture; and
drying the gel mixture to form the solid electrolyte, wherein
the precursor comprises a functional group containing a halogen atom, and
the halogen atom is a chlorine atom.

18. The method for producing the solid electrolyte according to claim 17, wherein the precursor comprises a metal alkoxide having the functional group containing a chlorine atom.

19. The method for producing the solid electrolyte according to claim 18, wherein the metal alkoxide having the functional group containing a chlorine atom is a silicon alkoxide having the functional group containing the chlorine atom.

* * * * *